United States Patent
Bijl et al.

(10) Patent No.: US 11,166,416 B2
(45) Date of Patent: Nov. 9, 2021

(54) SYSTEM AND METHOD FOR PRODUCING A PLANT

(71) Applicant: Vivi B.V., 's-Gravendeel (NL)

(72) Inventors: Jacob Johannes Bijl, Burgh-Haamstede (NL); Cornelis Frans Taco Visser, 's-Gravendeel (NL)

(73) Assignee: Vivi B.V., 's-Gravendeel (NL)

( * ) Notice: Subject to any disclaimer, the term of this patent is extended or adjusted under 35 U.S.C. 154(b) by 0 days.

(21) Appl. No.: 15/215,692

(22) Filed: Jul. 21, 2016

(65) Prior Publication Data
US 2017/0020092 A1    Jan. 26, 2017

Related U.S. Application Data

(63) Continuation of application No. PCT/EP2014/072164, filed on Oct. 15, 2014.

(30) Foreign Application Priority Data

Feb. 10, 2014  (NL) ...................................... 2012234

(51) Int. Cl.
*A01G 27/02* (2006.01)
*A01G 9/00* (2018.01)
(Continued)

(52) U.S. Cl.
CPC ................. *A01G 9/00* (2013.01); *A01G 9/02* (2013.01); *A01G 9/246* (2013.01);
(Continued)

(58) Field of Classification Search
CPC ...... A01G 31/00; A01G 31/001; A01G 31/02; A01G 31/06; A01G 9/1026; A01G 9/1033;
(Continued)

(56) References Cited

U.S. PATENT DOCUMENTS 1,264,096 A    4/1918   Lelievre
2,189,510 A *  2/1940   Swaney ................ A01G 31/02
                                            47/63
(Continued)

FOREIGN PATENT DOCUMENTS

CN       2444413 Y    8/2001
CN     103781349 A    5/2014
(Continued)

OTHER PUBLICATIONS

Gas exchange in Plants.*
(Continued)

*Primary Examiner* — Thanh Pham
(74) *Attorney, Agent, or Firm* — David P. Owen

(57) ABSTRACT

A system (100) for producing a plant (35), the system having an indoor environment, a plurality of plant holders (1) for growing and transporting a plant therein, a controller (105) for at least controlling temperature and humidity in the indoor environment. The plant holder has a semi-permeable foil (20) defining a non-planar boundary of an interior space and an exterior space, a reservoir (2), having an amount of liquid for feeding the plant. The reservoir (2) and the semi-permeable foil (20) are arranged to allow the plant to grow in the interior space. The semi-permeable foil (20) has permeation of water vapor.

14 Claims, 13 Drawing Sheets

(51) Int. Cl.
*A01G 9/02* (2018.01)
*A01G 13/02* (2006.01)
*A01G 27/04* (2006.01)
*A01G 9/24* (2006.01)
*A01G 27/00* (2006.01)

(52) U.S. Cl.
CPC ....... *A01G 13/0212* (2013.01); *A01G 27/008* (2013.01); *A01G 27/02* (2013.01); *A01G 27/04* (2013.01)

(58) Field of Classification Search
CPC .......... A01G 9/10; A01G 9/104; A01G 27/00; A01G 27/02; A01G 27/04; A01G 27/06
See application file for complete search history.

(56) References Cited

U.S. PATENT DOCUMENTS

| | | | |
|---|---|---|---|
| 4,027,427 A | 6/1977 | Stoller et al. | |
| 4,117,632 A | 10/1978 | Pearce | |
| 4,118,890 A * | 10/1978 | Shore | B65D 85/52 206/423 |
| 4,299,054 A * | 11/1981 | Ware | A01G 31/02 47/64 |
| 4,311,477 A * | 1/1982 | Kitamura | A01G 1/046 206/439 |
| 4,324,070 A | 4/1982 | Swisher | |
| 4,369,598 A | 1/1983 | Beckwith | |
| 4,400,910 A * | 8/1983 | Koudstaal | B65D 85/52 47/84 |
| 4,434,577 A | 3/1984 | Holtkamp | |
| 4,531,324 A * | 7/1985 | Yang | A01H 4/001 47/59 R |
| 4,903,432 A | 2/1990 | Velagaleti et al. | |
| 4,932,159 A | 6/1990 | Holtkamp, Sr. | |
| 5,054,234 A | 10/1991 | Cassells | |
| 5,171,683 A | 12/1992 | Kertz | |
| 5,860,249 A | 1/1999 | Holtkamp, Jr. | |
| 6,079,156 A | 6/2000 | Colovic | |
| 8,443,547 B2 * | 5/2013 | Visser | A01G 9/086 47/66.5 |
| 2003/0005865 A1 | 1/2003 | Washburn | |
| 2005/0011123 A1 * | 1/2005 | Dai | A01G 31/02 47/79 |
| 2005/0172548 A1 | 8/2005 | Bement | |
| 2009/0064576 A1 * | 3/2009 | Sugarek | A01G 27/04 47/81 |
| 2010/0319251 A1 | 12/2010 | Long | |
| 2011/0036006 A1 | 2/2011 | Griebel | |
| 2012/0017505 A1 * | 1/2012 | Bijl | A01G 9/1033 47/66.7 |
| 2012/0137581 A1 * | 6/2012 | Teasdale | A01G 9/10 47/66.6 |
| 2012/0219817 A1 * | 8/2012 | Konishi | C22C 21/00 428/596 |
| 2015/0027049 A1 * | 1/2015 | Bijl | A01G 22/00 47/66.7 |

FOREIGN PATENT DOCUMENTS

| | | |
|---|---|---|
| DE | 102009007415 A1 | 8/2010 |
| EP | 0287284 A1 | 10/1988 |
| FR | 2724812 A1 | 3/1996 |
| JP | S39021621 A | 10/1964 |
| JP | S53023756 U | 2/1976 |
| JP | S51159357 U | 12/1976 |
| JP | S59052856 U | 4/1984 |
| JP | S63048450 U | 4/1988 |
| JP | S63191144 U | 12/1988 |
| JP | S63313577 A | 12/1988 |
| JP | H01074747 U | 5/1989 |
| JP | H01127440 U | 8/1989 |
| JP | H01502421 A | 8/1989 |
| JP | H0155399 U | 10/1989 |
| JP | H07298797 A | 11/1995 |
| JP | 3039352 | 7/1997 |
| JP | 3053085 | 10/1998 |
| JP | 3104682 | 10/2004 |
| JP | 2004329130 A | 11/2004 |
| JP | 2004344023 A | 12/2004 |
| JP | 2005261278 A | 9/2005 |
| JP | 2007135449 A | 6/2007 |
| JP | 2009072075 A | 4/2009 |
| JP | 2009081996 A | 4/2009 |
| JP | 201029115 A | 2/2010 |
| JP | 2011217614 A | 11/2011 |
| JP | 2012514999 A | 7/2012 |
| NL | 97090 C | 2/2009 |
| WO | 0008922 A1 | 2/2000 |
| WO | 2005063000 A2 | 7/2005 |
| WO | 2005120212 A1 | 12/2005 |
| WO | 2009014422 A1 | 1/2009 |
| WO | 2010082814 A1 | 7/2010 |
| WO | 2013059500 A1 | 4/2013 |
| WO | 2013124794 A1 | 8/2013 |
| WO | 2013154424 A1 | 10/2013 |

OTHER PUBLICATIONS

Innervisions 1996. Printed from a website on May 31, 2016.
Earlier Search Report for priority application NL2008637 dated Jan. 10, 2013.
International Search report for PCT/NL2013/050259 dated Jul. 18, 2013.
Written Opinion for PCT/NL2013/050259 dated Jul. 18, 2013.
International Preliminary Report on Patentability (Ch. II) for PCT/NL2013/050259 dated Jun. 30, 2014.
Earlier Search Report for priority application NL2012234 dated Jul. 23, 2014.
International Search Report for PCT/EP2014/072164 dated Feb. 4, 2015.
International Preliminary Report on Patentability (Ch. I) for PCT/EP2014/072164 dated Aug. 16, 2016.

* cited by examiner

SYSTEM AND METHOD FOR PRODUCING A PLANT

CROSS-REFERENCE TO RELATED APPLICATIONS

This application is a continuation of PCT application number PCT/EP2014/072164 filed on Oct. 15, 2014, which claims priority from the Netherlands application number NL2012234 filed on Feb. 10, 2014. Both applications are hereby incorporated by reference in their entireties.

TECHNICAL FIELD

The invention relates to a production of a plant, in particular to a system for producing a plant and to a method for producing a plant.

BACKGROUND ART

Plants can be grown in greenhouses. In a greenhouse the growing environment of plants is controlled. A greenhouse is a structural building with different types of covering materials, such as a glass or plastic roof and frequently glass or plastic walls. Plants grow in a shared open space under the covering material. Plants grow in soil or substrate. Depending upon the technical specification of a greenhouse, factors which may be controlled include temperature, levels of light and shade, irrigation, fertilizer application, and atmospheric humidity.

However, such greenhouses do not provide good capability to avoid cross-contamination within the greenhouse. If a plant in the greenhouse is infected, pathogens may spread to neighbor plants. As a greenhouse typically contains a huge number of plants, the risk of cross-contamination is considerable.

A typical pot has an opening on the top for the air and another opening on the bottom for water (e.g. arranged on a water tray). Pathogens typically enter from these openings and then spread again via these openings.

Many attempts of closing off the bottom opening of a pot are not satisfactory. When the bottom opening is closed off, it becomes more difficult to supply oxygen to roots of the plant. Whether soil or hydroponics are used, since oxygen can no longer come from the bottom but only from above the soil/water, the roots will get less oxygen. The situation is particularly worse when the top opening is also closed off, e.g. using a cap arranged on a pot, with a small filter on the top. When a filter is used to block pathogens from above, air/vapor exchange becomes very limited. As a result, oxygen can hardly reach the roots so that the plant does not grow well.

SUMMARY OF INVENTION

It is therefore an objective to reduce the risk of cross-contamination between plants.

A first aspect of the invention relates to a system for producing a plant, the system comprising:
- an indoor environment;
- a plurality of plant holders for growing and transporting a plant therein;
- a controller for at least controlling temperature and humidity in the indoor environment; and wherein the plant holder comprises:
- a semi-permeable foil defining a non-planar boundary between a (closed) interior space of the plant holder and an exterior space in the indoor environment (the exterior space is e.g. shared by the plant holders);
- a reservoir, confining an amount of liquid in the interior space for feeding the plant, wherein the reservoir and the semi-permeable foil are arranged to allow the plant to grow in the interior space, wherein the semi-permeable foil has permeation of water vapor and air, and efficiently blocks pathogens.

The system should be an in-door system (e.g. arranged in an in-door space comprising one or more cabins) for producing a (green) plant. The plant may be lettuce, herbs or sprouts. The liquid preferably comprises water and growth medium.

A semi-permeable foil is used to define a boundary of an interior space and an exterior space. A plurality of plant holders thus provide a plurality of interior spaces. The interior spaces are separated from each other. The plant holders can share the same exterior space. The semi-permeable foil can provide a good separation between plants. Each plant holder can thus function like an individual greenhouse, to prevent pathogens from coming in as well as from going out, and/or to maintain a higher relative humidity in the interior space than that in the exterior space.

The semi-permeable foil forms a non-planar boundary. The boundary may be such that it is suitable for defining a hollow for containing the plant, e.g. in a form of a bag. The semi-permeable foil preferably have at least two surface areas that are not co-planar, which are semi-permeable. Such a semi-permeable foil can improve air circulation in the plant holder. Ventilation, which comprises inlet and outlet of water vapor, can thus be achieved in each plant holder. In an embodiment a first surface area of the semi-permeable foil will form an inlet, whereas a second surface area that is non-planar with the first surface area, will form an outlet.

The semi-permeable foil is preferably permeable to water vapor and air in both directions. The semi-permeability may be achieved by providing perforations on the semi-permeable foil. In an embodiment, each perforation has an open area in a range between 0.0003-0.035 mm$^2$ (e.g. having a diameter between 10-100 μm).

In an embodiment, the semi-permeable foil comprises uniformly distributed perforations. The perforations may be arranged in a quantity of (on average) 0.01 perforation per cm$^2$ to 1000 perforations per cm$^2$, depending on a desired permeation capacity, for instance in terms of quantities per unit of time. The inlets and the outlets can be formed by the uniformly distributed perforations on the semi-permeable foil. A first group of perforations forms the inlets, and a second group of perforations forms the outlets. Preferably there is no other openings other than the perforations on the semi-permeable foil, which perforations provide the semi-permeable property of the foil. The first group of perforations may be arranged to allow air to come into the interior space, e.g. from a lateral surface of the non-planar boundary. The second group of perforations may be arranged to allow water vapor and air to go out to the exterior space from the interior space, e.g. from an apex surface of the non-planar boundary. The lateral surface and the apex surface may intersect at an angle of 60-135 degrees. The perforations functioning as outlets thus have a similar function to chimneys on a roof, and the perforations functioning as inlets thus have a similar function as windows on a wall. Dry air flows into the inlets and moist air/vapor flows out from the outlets. An ideal circulation can thus be achieved.

In an embodiment the complete boundary between interior space and exterior space of the plant holder is formed by the semi-permeable foil. In an embodiment the reservoir is received in the interior space of the plant holder. This allows sufficient area on the non-planar boundary to arrange (dry air) inlets and (moist air) outlets. In another embodiment the reservoir forms part of the boundary of the plant holder. Preferably at least 80%, more preferably at least 90%, more preferably at least 95%, of the complete boundary between interior space and exterior space of the plant holder is formed by the semi-permeable foil.

The reservoir confines an amount of liquid in the interior space of the plant holder. The plant holder is arranged to feed the plant with the confined water in the interior space. The plant holder is for example arranged without a water supply from the exterior space. This allows maintaining a sterile environment within the plant holder.

The air circulation within the interior space helps the roots to get oxygen, even if a further separation (e.g. a membrane with a (small) opening for liquid supply) is arranged between a growth space of the plant and the liquid. Thus, although the plant and the water are both confined in the interior space, the roots can still get sufficient oxygen, which may be brought from the exterior space or produced by the plant through a photo-synthesis process.

In an embodiment, the semi-permeable foil has a thickness that allows forming a plurality of perforations as tunnels, wherein a ratio of a square-root of an area of a perforation and the thickness of the semi-permeable foil is between 0.65 and 1.35, preferably between 0.68 and 1.32. As the semi-permeable foil has a thickness, the perforations (e.g. holes) may form a plurality of tunnels (e.g. the thickness of the semi-permeable foil becomes the length of the tunnel). The inventors observed that, when the dimensions of the tunnel are within a certain range, air circulation and/or ventilation via the inlets and outlets of the interior space can be significantly improved. This happens when the ratio of a square-root of the area of a perforation and the thickness of the semi-permeable foil is between 0.6 and 1.35, preferably 0.66-1.3, more preferably 0.67-1.2. In an embodiment, a surface area of each perforation is in a range of 0.002-0.035 mm$^2$ (preferably in a range between 0.004-0.02 mm$^2$), e.g. the diameter of each perforation is in a range of 60-200 μm, more preferably in a range of 80-160 μm, and/or the thickness of the semi-permeable foil is in a range of 90-110 μm. When the perforations have an surface area less than 0.035 mm$^2$ (e.g. having a diameter less than 100 μm), the perforations also have a good performance for blocking pathogens. In general, smaller perforations provide better protection from pathogens. Taking both air circulations and pathogen blocking as described above into account, in a preferred embodiment, a ratio of a square-root of the area of a perforation and the thickness of the semi-permeable foil is arranged in a range between 0.6 and 0.8.

In an embodiment, the system further comprises an air distributor for generating an air flow on/over the plant holders, preferably on and/or over the semi-permeable foil. This further improves the ventilation effect. The system may comprise an air distribution device to further improve the air circulation. In an embodiment, the system comprises an airflow generator for creating a laminar flow on at least two surface areas of the non-planar boundary. In an embodiment, the airflow generator is arranged to create an airflow at a speed of 0.5-2 m/s, more preferably in a range of 0.9-1.1 m/s.

In an embodiment, the semi-permeable foil and the controller is arranged to allow the liquid to evaporate at a controlled rate, such that the amount of liquid in the interior space decreases at a rate of 10-30 ml per 24 hours, more preferably at a rate of 15-25 ml per 24 hours.

In an embodiment the plant holder, preferably the semi-permeable foil is arranged to maintain a water vapor % in the interior space at a higher level than the water vapor % in the exterior space.

In an embodiment the plant holder may form a bag, e.g. in the form of a non-rigid container made of plastic or other flexible material, and is easy to carry. In an embodiment the plant holder has a carriage handle, preferably on a top side, whereas the reservoir is positioned near a bottom side of the plant holder.

In an embodiment the controller is adapted for growing the plant in a predetermined temperature range. The range may be substantially at a certain fixed temperature, or a range of ±1 or ±10° C., or even a larger range.]

In an embodiment, the controller is adapted for growing the plant in a predetermined temperature range or wherein the controller is configured to adjust and/or maintain the predetermined temperature range in the indoor environment; and/or wherein the controller is adapted for maintain a predetermined humidity range in the indoor environment; and/or wherein the controller and the semi-permeable foil is arranged to maintain a relative humidity less than 65% RH in the exterior space and to maintain a relative humidity more than 75% RH in the interior space, e.g. by adjusting a surface area of the perforation on the semi-permeable foil. Preferably, the controller and the semi-permeable foil is arranged to maintain a relative humidity in the interior space at least 10% (preferably 30%) higher than a relative humidity in the exterior space. The system may be arranged without a water supplier for feeding the plants from the exterior space. In an embodiment, the plant holder lacks a water inlet.

The relative humidity (q) is a ratio of the partial pressure of water vapor (H2O) ($e_w$) to the saturated vapor pressure of water ($e^*_w$) at a given temperature. Relative humidity is normally expressed as a percentage of such a ratio. Such a difference in humidity can help the performance of the chimney effect, because moist air is lighter than dry air. Therefore, moist air of the same temperature as dry air rises because it is less dense than the dry air. In an embodiment, such an effect results in inlets for dry air on one side (e.g. 'standing walls') of the plant holder and outlets for moist air on another (top) side of the plant holder. As a result, the difference in humidity between the interior space and the exterior space further improves the air circulation in the plant holder. An embodiment utilizing such an effect is described below in FIG. 9A.

In an embodiment, the system further comprises a light source for supplying light to the plant.

In an embodiment, the indoor-environment and the plant holders are dimensioned such that the indoor-environment accommodates more than 10,000 plant holders per 300 m$^3$. In an embodiment, the system comprises a cabin for arranging a plurality of plant holders at different heights, e.g. in a stacked shelf-like cabin.

Such a system may effectively create more than 10,000 individual greenhouses, without having to arrange 10000 ventilation machines for the 10000 effective greenhouses. In an embodiment, the system comprises 100,000 plant holders. In an embodiment the system comprises 1-5 cabins arranged in an indoor space around 8-12 m×6-10 m×2-4 m (e.g. L×W×H).]

In an embodiment, the plant holder (e.g. the semi-permeable foil) is arranged to allow changing a volume of the interior space for providing at least:
  a first growing mode having an interior space of a first volume for growing a plant at a first stage; and a second growing mode having an interior space of a second volume for growing the plant at a second stage, wherein a ratio between the first volume and the second volume is less than 1/2.

Preferably, the volume of the interior space is changeable such that a distance between a surface of the semi-permeable foil and a leaf of the plant is less than 5 cm, e.g. the volume is so large that the semi-permeable foil does not touch the plant. If the foil touches the leaf, there is a risk that the leaf burn.

In an embodiment, the plant holder, and preferably the semi-permeable foil, is made of a self-supporting material in a form of a bag for containing the plant, so that a shape of the bag is changeable for changing the volume of the interior space.

Alternatively, the plant holder, preferably the semi-permeable foil, may be made of an elastic material, stretching on a three-dimensional frame to form the interior space. The frame may comprise an adjustment element (e.g. a motor) to change a shape (e.g. changing a length/width/height of the frame) to change the volume of the interior space.

In an embodiment, the semi-permeable foil is arranged to allow changing a volume of the interior space by applying a pressure or exerting a force on the semi-permeable foil.

In an embodiment, the interior space in a first growing mode has a volume of 800 cm3, and the interior space in a second growing mode has a volume of 125,000 cm3.

In an embodiment, the reservoir comprises:
a bottom; and/or
a wall; and/or
one or more notches for supporting a plant root, such as one or more plug stands, extending from a bottom of the reservoir, arranged to accept a tip of an injector plug for seeding and planting; and/or
a separation for defining a boundary of a space in the reservoir to contain the liquid in the space.

In an embodiment the reservoir is made of a flexible material, wherein the flexible material is arranged to allow changing an area of the bottom and/or a height of the wall of the reservoir.

The shape of the reservoir may be changeable for adjusting a water level confined in the interior space (e.g. in the reservoir). This may help a young plant or a seed to get water, as water is not added during the growth. In this embodiment, the water level can thus be adjusted by simply put the reservoir onto a holding element of a different shape. It is thus not needed to open the interior space to adjust the water level, so the plant can be kept safe.

In an embodiment of the plant holder, the semi-permeable foil comprises a portion that is attached to the reservoir. In an embodiment the reservoir is made of a flexible material arranged to allow changing a shape of the reservoir in accordance with a shape of the attached portion of the semi-permeable foil.

In an embodiment, the reservoir is arranged completely in the interior space, and the semi-permeable foil may for example comprise a bottom portion for defining a shape of the reservoir, e.g. the reservoir has a changeable shape, and (the bottom portion of) the semi-permeable is arranged to attach to the reservoir for defining its shape. The flexible material may be arranged to allow changing a shape of the reservoir in accordance with a shape of the bottom portion of the semi-permeable foil. In an embodiment, both the semi-permeable foil and the reservoir form flexible bags, e.g. a 'bag in a bag' arrangement. The reservoir bag should be made of a self-supporting material for maintaining a shape. Preferably, the reservoir bag comprises a first liquid containing mode and a second liquid containing mode, wherein the first liquid containing mode and the second liquid containing mode have a different liquid level with respect to the same amount of liquid. The liquid level and/or space for growth of the plant can be easily achieved by a method of: pulling up a bag of the semi-permeable foil (e.g. which carries the plant and a reservoir bag therein) from a first holding element for defining a first shape of the semi-permeable foil and the reservoir bag; and putting the bag of the semi-permeable foil to a second holding element for defining a second shape of the semi-permeable foil and the reservoir bag.

Any of the embodiments of the first aspect can be combined with any of the features disclosed in this application in any combination, unless otherwise indicated.

A second aspect of the invention relates to a method for producing a plant in an indoor environment, the method comprising:
providing a plurality of plant holders in an indoor environment;
growing a plant in an interior space of the plant holder;
adjusting and maintaining temperature in the indoor environment for growing the plant in a predetermined temperature range;
transporting the plant holder having the grown plant in the interior space of the plant holder to a place for sale, wherein the plant holder comprises:
a semi-permeable foil defining a non-planar boundary of the interior space and an exterior space of the plant holder; and
a reservoir, comprising an amount of liquid for feeding the plant, wherein the semi-permeable foil has permeation of water vapor.

In such way, growing and packing for sale can be integrated. The semi-permeable foil (e.g. forming a bag) can be used for not only growing but also for packing for transporting/sale. In other words, the plant needs not to be repacked for sale. This avoids the risk of infection during repacking for transporting or sale. In an embodiment, the non-planer boundary covers at least 90% of an entire boundary of the interior space, e.g. the entire boundary of the interior space is made of the semi-permeable foil. This makes it particular straightforward to use the same plant holder as a package for transporting.

Therefore, the method has an advantage that the plant does not need to be transplanted and repacked at all. As such, the plant can be kept safe from pathogens from growing to transporting and further to selling process, until a consumer opens it to eat.

A volume of the interior space may be increased while keeping the interior space separated from the exterior space, at two or more stages of growth of the plant.

A shape of the boundary defined by the semi-permeable foil may be adjusted, such that a volume of the interior space is changed.

A depth and a width of the reservoir within the interior space may be adjusted, during growth of the plant.

A shape of the reservoir may be adjusted by adjusting a shape of the non-planer boundary.

In an embodiment, the semi-permeable foil comprises a number of perforations per unit area. In addition, an air flow on a surface of the semi-permeable foil may be provided. Moreover, the amount of liquid may be pre-determined, by an area of each perforation, the number of perforations per unit area, the pre-determined temperature range, a speed of the air flow, and a period from growth to the transport.

In an embodiment, a water loss rate can be determined by a multiple of an area (size) of each perforation and the number of perforations per unit area (e.g. $cm^2$), temperature and the air flow. By taking the growth period into account, it can then be pre-determined how much water is needed until the transport. One then only needs to add some additional water for the plant to consume during the transport. In this way, the plant can get sufficient water throughout the stages of growth, transport and being sold in the supermarket completed in the isolated interior space, and can grow even during the transport and even in the supermarket.

In an embodiment, providing the plant holders comprises:
filling the liquid into the reservoir;
sterilizing the plant holder;
closing the reservoir;
providing an injector plug, the injector plug comprising the plant or a seed of the plant;
plugging the injector plug into the reservoir for forming a passage for supplying the liquid from the reservoir to the plant; and
providing the semi-permeable foil for forming the interior space for enclosing the injector plug.

Any of the embodiments of the second aspect can be combined with any of the features disclosed in this application in any combination, unless otherwise indicated.

In an embodiment, the method comprises two or more stages, at least comprising a pre-growing stage and a growing stage.

In an embodiment, the semi-permeable foil and the reservoir are arranged to define a plant growing space and a liquid storing space, separated by a closed surface, wherein the method comprises in a pre-growing stage, providing an injector plug for seeding or planting in the plant growing space.

In an embodiment, the method further comprises plugging the plant holder to transit to a plugged stage, wherein plugging comprises opening closed surface, and extending the injector plug from the plant growing space into the liquid storing space, and forming a passage for supplying the liquid to the plant from the liquid storing space to the plant in the plant growing space.

In an embodiment, the method further comprises: adjusting a shape of the boundary defined by the semi-permeable foil, such that a volume of the interior space is changed.

In an embodiment, the method further comprises: adjusting a depth and a width of the reservoir within the interior space, during growth of the plant.

In an embodiment, the method further comprises: adjusting a shape of the reservoir by adjusting a shape of the non-planer boundary.

In an embodiment, the semi-permeable foil comprises a number of perforations per unit area, wherein the method further comprising:
providing an air flow on a surface of the semi-permeable foil; and
pre-determining the amount of liquid, depending on a surface area of each perforation, the number of perforations per unit area, the pre-determined temperature range, a speed of the air flow, and a period from growth to the transport.

In an embodiment, providing the plant holders comprises:
filling the liquid into the reservoir;
sterilizing the plant holder;
closing the reservoir;
providing an injector plug, the injector plug comprising the plant or a seed of the plant;
plugging the injector plug into the reservoir for forming a passage for supplying the liquid from the reservoir to the plant; and
providing the semi-permeable foil for forming the interior space for enclosing the injector plug.

A third aspect of the invention relates to a semi-permeable foil for use in the first or the second aspect of the invention. The semi-permeable foil has permeation of water vapor, wherein the semi-permeable foil is made of a self-supporting material for maintaining a shape for defining a non-planar boundary of an interior space and an exterior space of the plant holder.

In an embodiment, the non-planar boundary comprises an apex area and a lateral area, wherein a ratio of the apex area and the lateral is between 1/5 and 1/3.

In an embodiment, the semi-permeable foil comprises a first plane and a second plane acute to each other.

The apex area may be arranged in a form of a triangular house roof, an N-sided pyramid, or a cone, on the top boundary of the plant holder. In an embodiment, the apex area relates to how moist air goes out, while the lateral area relates to how dry air comes in. The area of the apex portion and the area of the lateral portion are thus preferably have a balanced ratio to facilitate the chimney effect.

On the top of the apex portion (e.g. a top point or a top line), an sealing element may be provided for sealing the bag. As such, an isolated interior space may be easily created.

The lateral area may comprise one ore more planes, including a first plane. The apex area may comprise one or more planes, including a second plane. The first plane and the second plane may define and angle in a range of 20-90 degrees, preferably in a range of 30-75 degrees, more preferably in a range of 30-60 degrees.

In an embodiment, the semi-permeable foil comprises perforations spread over the apex area and the lateral area.

Perforations are preferably spread over a surface of the semi-permeable foil of a density between 10-40 perforations per cm2.

In an embodiment, the semi-permeable foil is made of a transparent material or a semi-transparent material. Transparent material or semi-transparent material, e.g. white plastic can allow light to enter the plant holder, so the plant can carry out the light synthesis process. It is observed that a semi-transparent material may result in reflections inside the plant holder, so the plant can get even more light.

Any of the embodiments of the third aspect can be combined with any of the features disclosed in this application in any combination, unless otherwise indicated.

A fourth aspect of the invention relates to vegetable, produced according to the preceding aspects of the invention.

Any of the embodiments of the fourth aspect can be combined with any of the features disclosed in this application in any combination, unless otherwise indicated.

A fifth aspect of the invention relates to a plant holder, comprising:
a reservoir having therein an amount of liquid;
a separation for defining a boundary of a space in the reservoir to contain the liquid in the space;
at least one injector plug for seeding or planting a plant, wherein the injector plug comprises:
a hollow for carrying a seed or a plant;
a housing defining a space for accommodating a plant substrate or a wick string; and a rigid tip for inserting into the reservoir through the separation, such that a portion of the housing is immersed in the liquid.

The rigid tip may be arranged to penetrate a tear or break line. The rigid tip may be provided with a sharp corner for penetrating a foil having a thickness between 80-200 μm.

In an embodiment, the separation is impermeable to at least one of: fluid, gas, moisture, micro-organisms, and other contaminants.

In an embodiment, the separation comprises at least one accommodation for guiding the at least one injector plug through the separation.

In an embodiment, the accommodation comprises a recess extending from the separation.

In an embodiment, the recess is oriented to extend into the reservoir.

In an embodiment, the separation comprises at least one break-through position, which defines an intended position for inserting the at least one injector plug into the reservoir.

In an embodiment, the break-through position is closed in a watertight manner, prior to inserting the at least one injector plug through the separation.

In an embodiment, the break-through position comprises at least one of: a position indicator, a weakening in the separation, a tear or break line, and the like.

In an embodiment, the accommodation is designed to comprise the break-through position.

In an embodiment, the at least one injector plug is designed to contain a substrate in addition to the plant material.

In an embodiment, a closing cap is arranged over the separation, opposite the reservoir.

In an embodiment, the closing cap comprises at least one: a lid, and a box shaped cap.

In an embodiment, the plant holder comprises a bag for enclosing a surface of the separation, wherein the bag is designed to be compressed for inserting the at least one injector plug through the separation and to be expanded thereafter.

In an embodiment, the closing cap is designed to close fittingly engage either of the reservoir and the separation.

In an embodiment, the closing cap is hingedly attached to either of the reservoir and the separation.

In an embodiment, a sheet is arranged over the separation. The sheet may be liquid soluble, when contacted by liquid from the reservoir. Additionally or alternatively, the sheet may be tensioned over the separation. In an embodiment, at least one injector plug is arranged between the sheet and the separation.

In an embodiment, the sheet or the closing cap forms a press arranged to insert the injector plug through the separator.

In an embodiment, the reservoir comprises one or more plug stands, extending from a bottom of the reservoir for accepting the tip of the injector plug.

In an embodiment, the plug stand comprises a recess for accommodating the tip of the injector plug.

In an embodiment, the recess is adapted for providing a space for accommodating roots of the plant.

In an embodiment, the separation and the reservoir are integrated in a form of a reservoir bag, wherein the injector plug is adapted for penetrating through the reservoir bag. The reservoir bag may be made of a self-supporting material.

In an embodiment, the plant holder further comprises a bag for defining a non-planar boundary of a space for growing a plant therein.

In an embodiment, the reservoir comprises one or more plug stands, extending from a bottom of the reservoir for accepting the tip of the injector plug, wherein the plug stand comprises a recess for accommodating the tip of the injector plug.

In an embodiment, the separation and the reservoir are integrated (e.g. forming an integral part) in a form of a bag, wherein the injector plug is adapted for penetrating through the bag.

Any of the features disclosed herein can be combined with a plant holder according to the fifth aspect.

End users and/or consumers sometimes have a desire to germinate seeds and/or otherwise cultivate and/or grow plants, or even vegetables and fruit, themselves. Also, in addition to private end consumers, professional growers may sometimes have a need to germinate, cultivate and/or grow plants outside of protected environments, such as greenhouses and laboratory type facilities.

There are, to the best knowledge of the inventors of embodiments according to the present disclosure, no practical products available to cater to these private or professional growers, to allow these growers the possibility of germinating, cultivating and/or growing plants easily and with little risk of failure to grow plants. Most often these private or professional growers are dependent on separate acquisition of trays or pots; substrate like earth, soil, peat, coco, glass or stone wool or the like; and initial plant material such as seeds, seedlings and the like. These private or professional growers then have to fill the pots or trays with a selection of substrate(s) and plant the seeds and/or seedlings into the substrate in the pots or trays. Thereafter these growers need to carefully tend the plants to nurse them into development and growth, which is often prone to failure, which is disheartening to private growers and potentially detrimental to professional growers.

Embodiments of the present invention are directed at furnishing a plant holder in the form of an off-the-shelf product, which will allow private and/or professional growers to more easily initiate development and/or growth of plants, and decrease the chance of failure to grow a healthy plant considerably, at least in some embodiments of the present disclosure.

To this end, certain embodiments of the present disclosure provide a plant holder, comprising: a liquid reservoir having therein an amount of liquid; a separation, which is arranged to close off the reservoir to contain the fluid in the closed off reservoir; at least one injector plug, which is designed to at least contact or contain at least plant material and is adapted to be inserted into the reservoir through the separation.

Said embodiments of the present disclosure allow a private or professional end user or consumer to insert the injector plug, containing at least the plant material, such as a seed, a seedling or the like, through the separation into the reservoir to bring the plant material into contact with the fluid in the reservoir, where up to said insertion, the plant material will have remained without water supply or other nourishing fluid. By the aforementioned insertion of the injector plug through the separator into the reservoir, the plant material is provided with access to the fluid and thereafter received nourishment. The fluid may be water and/or may contain additives, such as pesticides, herbicides, nutrients, and the like, and the amount of fluid and/or of the additives in the reservoir may be tailored to the needs of specific types of plant material.

Thus, in specific embodiments of the present disclosure, after initiation of development of the plant material by inserting the injector plug through the separator, the development of the plant material can—to a high degree—follow a predetermined course. Consequently, the end user, consumer of professional grower not only initiates development of the plant material simply and easily and in full control of the timing thereof, but may also be relieved of much of the care needed to nurture the plant material towards maturity. Therein, the amount of fluid and/or water in the reservoir may be sufficient to supply nourishment to the plant material for a predetermined period of time.

It is noted here that the plant material does not necessarily need to be contained in or on the injector plug, but that the injector plug after insertion thereof through the separation may form a fluid guide, for instance based on capillary action, from the reservoir to an actual location of the plant material, which may be at a distance from the position where the injector plug is actually inserted through the separation. For this, the injector plug may comprise a wick type element, to absorb water and/or other fluid and, again for instance on the basis of capillary action, water and/or other fluid can be transported over any such distance from the reservoir to the plant material, to furnish water to the plant material and nourish it with water and/or other fluid. Within the framework of the thus generally described embodiments of the present disclosure, several preferred embodiments are possible, aspects of which may be defined in the appended dependent claims or be described in the figure description herein below.

In an embodiment, the separation may be essentially impermeable to at least one influence from a group comprising fluid, gas, moisture, micro-organisms, and other contaminants. In another embodiment, the separation is permeable to oxygen, but is impermeable to pathogens. Likewise, a sheet over the at least one injector plug or a closing cap, both discussed herein below, can also be at least essentially impermeable to the same influences. As a consequence the effect is achieved that the plant material is effectively protected against threats from the environment of the plant holder in such embodiments of the present disclosure.

Further, in another preferred embodiment, additionally or alternatively the feature may be provided that the separation comprises at least one accommodation, which is designed to accommodate the at least one injector plug before insertion thereof through the separation. With injector plugs arranged or accommodated in one or more predefined accommodations, use by an end user, consumer or professional grower is facilitated in that it is made easier to insert the injector plug through the separation, from an unplugged state to a plugged status. In an embodiment of the unplugged state, the semi-permeable foil is arranged to form a complete boundary of the interior space, wherein the reservoir is enclosed in the interior space. The reservoir in turn defines a complete boundary of a second interior space, confining the liquid. An injector plug is provided with a seed or a young plant. The injector plug is placed in the first interior space for plugging into the second interior space.

At least, as a consequence of such features, when a plurality of injector plugs is used, such accommodations may predefine distances between which the separate injector plugs are to be inserted through the separation, thereby ensuring appropriate distances between developing and/or even fully grown plants. In such a preferred embodiment the additional feature may be provided that the accommodation comprises a recess in the separation. Such a recess may form an appropriate accommodation, in particular if the recess is shaped and formed in correspondence with the shape and form of the injector plug. Preferably, such a recess or more general accommodation will not encompass the injector plug close fittingly, but leave room for movement of the injector plug in at least one orientation, preferably the orientation corresponding with insertion of the injector plug through the separation. Additionally or alternatively, in an embodiment having an accommodation for the injector plug, the recess is oriented to extend into the reservoir. Thus a predetermined orientation for insertion of the injector plug through the separation to extend into the reservoir thereafter is defined.

In a preferred embodiment of a plant holder according to the present disclosure, additionally or alternatively the feature may be provided that the separation comprises at least one break-through position, which defines an intended position for inserting the at least one injector plug into the reservoir. The breakthrough position helps the end user, consumer or professional grower to insert the injector plug through the separation at a desired position, rather than an arbitrary position. Preferably, the break-through position is closed in a watertight manner, prior to inserting the at least one injector plug through the separation. Consequently, the plant material is kept from the water or other liquid within the reservoir and the point in time of activating germination or another growth stage if kept well under the control of the end user, consumer or professional grower. Additionally or alternatively in an embodiment having the breakthrough position, preferably the break-through position comprises at least one of: a position indicator, a weakening in the separation, a tear or break line, and the like. Thereby, insertion of the injector plug at the chosen location of the breakthrough position is facilitated relative to insertion of the injector plug at any other position, thus inviting the end user, consumer or professional grower to actually make efficient use of the provided breakthrough position, rather than attempting insertion of the injector plug at any other location of the separation.

In an embodiment having such a breakthrough position as well as an accommodation for the injector plug, embodiments may exhibit the additional or alternative feature that the accommodation is designed to comprise the breakthrough position. As a consequence, an injector plug contained in an accommodation can simply be inserted through the separation at the precise location of the accommodation, as the location of the accommodation coincides with the breakthrough position, which may be embodied in the form of a type of weakening or the like.

Thereby, the end user, consumer or professional grower will have practically no alternative but to insert the injector plug through the separation of the precise location of the coinciding accommodation and breakthrough position.

In yet another preferred alternative or additional embodiment of a plant holder according to the present disclosure in general, the at least one injector plug is designed to contain a substrate in addition to the plant material. Such a substrate may provide a basis for route development of the plant material. If the actual plant material is at a distance from the injector plug, than still substrate may be provided within the injector plug, to provide additives such as nutrients herbicides and pesticides to water or other liquid, when drawn up from the reservoir. In such an embodiment, the substrate may act as the buffer or storage of such additives.

In yet another preferred alternative or additional embodiment of a plant holder according to the present disclosure in general, a closing cap (e.g. a lid) is arranged over the separation, opposite the reservoir. In such an embodiment having a closing cap, the closing cap comprises at least one: a lid, and a box shaped cap. Alternative embodiments of caps to be arranged over the plant material at least in a development stage of the plant material, are also within the scope of the embodiments according to the present disclosure. A closing cap can provide a further barrier for protection of the plant material, after development thereof has been initiated by insertion of the injector plug through the separation, to keep out harmful influences like insects, micro organisms and the like, from the space defined by the reservoir and the closing cap. In an additional or alternative embodiment having a closing cap, the closing cap comprises a bellows shaped bag, designed to be compressed for inserting the at least one injector plug through the separation and to be expanded thereafter. In such an embodiment, the bellows shaped bag may form a tool for inserting the injector plugs through the separation, in particular in a compressed state thereof, and even more in particular, when the injector plugs are aligned in a direction intended for the injector plugs to be inserted through the separation. In particular when protection of the interior of the space defined by the closing cap and the reservoir and/or the separation is envisaged or intended, embodiments of plant holders according to the present disclosure may exhibit the feature that the closing cap is designed to close fittingly engage either of the reservoir and the separation. Further, a plant holder having a closing cap in general may exhibit the additional or alternative feature that the closing cap is hingedly attached to either of the reservoir and the separation. Thus a mechanical connection between the cap and the reservoir or separation is provided, so that components and elements of embodiments of the present disclosure can be easily together, while ensuring easy access to the plant material at any stage of the development thereof.

In yet another preferred alternative or additional embodiment of a plant holder according to the present disclosure in general, a sheet is arranged over the separation. A sheet and a cap can be formed by the same or a singular element, or the one can be integrated into the other. In particular, it is noted here that the sheet or the closing cap may form a press, arranged to insert the injector plug through the separator. The sheet or closing cap may consequently be a tool, handle or instrument for generating leverage to insert the injector plug through the separation. Sheet in general can provide extra protection against harmful influences from outside, just like the aforementioned closing cap. This sheet is mentioned here, since the function thereof can augment or enhance a function of a closing cap, for protection of the plant material at or after initial development thereof. In particular if a separate closure cap is provided, then this sheet may function as the main protection at this stage before insertion of the injector plug through the separation, where after the closure cap may take over to perform this function, and in particular though not exclusively in such an embodiment the sheet may be liquid soluble, when contacted by liquid from the reservoir. In general, about the liquid solubility of the sheet, it is noted that prior to insertion of the injector plug through the separation, the sheet can act as a protection against harmful influences, as noted above. After the injector plug is inserted through the separation, water and/or other liquid is freed from the reservoir and the sheet may be solved thereby or dissolved therein, thus providing access to more air to the developing plant material. To ensure a desired positioning of the injector plug relative to the separation, a specific embodiment of a plant holder according to the present disclosure may exhibit the feature that the sheet is tensioned over the separation, and the at least one injector plug is arranged between the sheet and the separation. It is noted, that the sheet may be tensioned over the separation, even without including the injector plug between the sheet and the separation.

In yet another preferred alternative or additional embodiment of a plant holder according to the present disclosure in general, comprising a sheet or a closing cap, the plant holder may exhibit the feature that the sheet or the closing cap forms a press arranged to insert the injector plug through the separator. Thereby, insertion of the injector plug through the separation may be facilitated.

In an embodiment, the reservoir comprises one or more plug stands, extending from a bottom of the reservoir for accepting the tip of the injector plug.

In an embodiment, the plug stand comprises a recess for accommodating the tip of the injector plug.

In an embodiment, the recess is adapted for providing a space for accommodating roots of the plant.

In an embodiment, the separation and the reservoir are integrated in a form of a reservoir bag, wherein the injector plug is adapted for penetrating through the reservoir bag.

In an embodiment, the reservoir bag is made of a self-supporting material.

The plant holder may comprise a bag for defining a non-planar boundary of a space for growing a plant therein.

Following the above generic description of embodiments of the present disclosure, below a description of the appended drawing is provided, in which more detailed embodiments of the present disclosure are depicted. The more detailed embodiments of the present disclosure are by no means intended as limitations on the scope of protection, as defined in the appended claims, and should in no case be interpreted as such. The following description of the more detailed embodiments in the appended drawings contains reference numbers to elements, components and aspects of specific embodiments and throughout the following description such reference numbers may apply to similar or identical elements, components and aspects of also other specifically and separately shown embodiments. Any of the features disclosed herein can be taken in isolation, unless explicitly indicated that combinations with other features are necessary. The disclosure encompasses all explicit and any implicit features. Divisional or continuation applications can be filed for any combination of explicit or implicit subject matter disclosed herein.

A sixth aspect of the invention concerns a plant holder in an unplugged state for seeding or planting a plant in an indoor environment, the plant holder comprising:
  a semi-permeable foil for defining a complete boundary of a first closed space;
  a reservoir, arranged in the first interior space, defining a complete boundary of a second closed space; and
  and injector plug, provided with one or more seeds or one or more sprouts, wherein the reservoir confines an amount of liquid in the second closed space, and wherein the injector plug is placed in the first interior space for plugging into the second interior space for finishing the seeding or planting.

BRIEF DESCRIPTION OF THE SEVERAL VIEWS OF THE DRAWINGS

Embodiments will now be described, by way of example only, with reference to the accompanying schematic drawings in which corresponding reference symbols indicate corresponding parts, and in which.

The figures are meant for illustrative purposes only, and do not serve as restriction of the scope or the protection as laid down by the claims.

DESCRIPTION OF EMBODIMENTS

Figure 1:
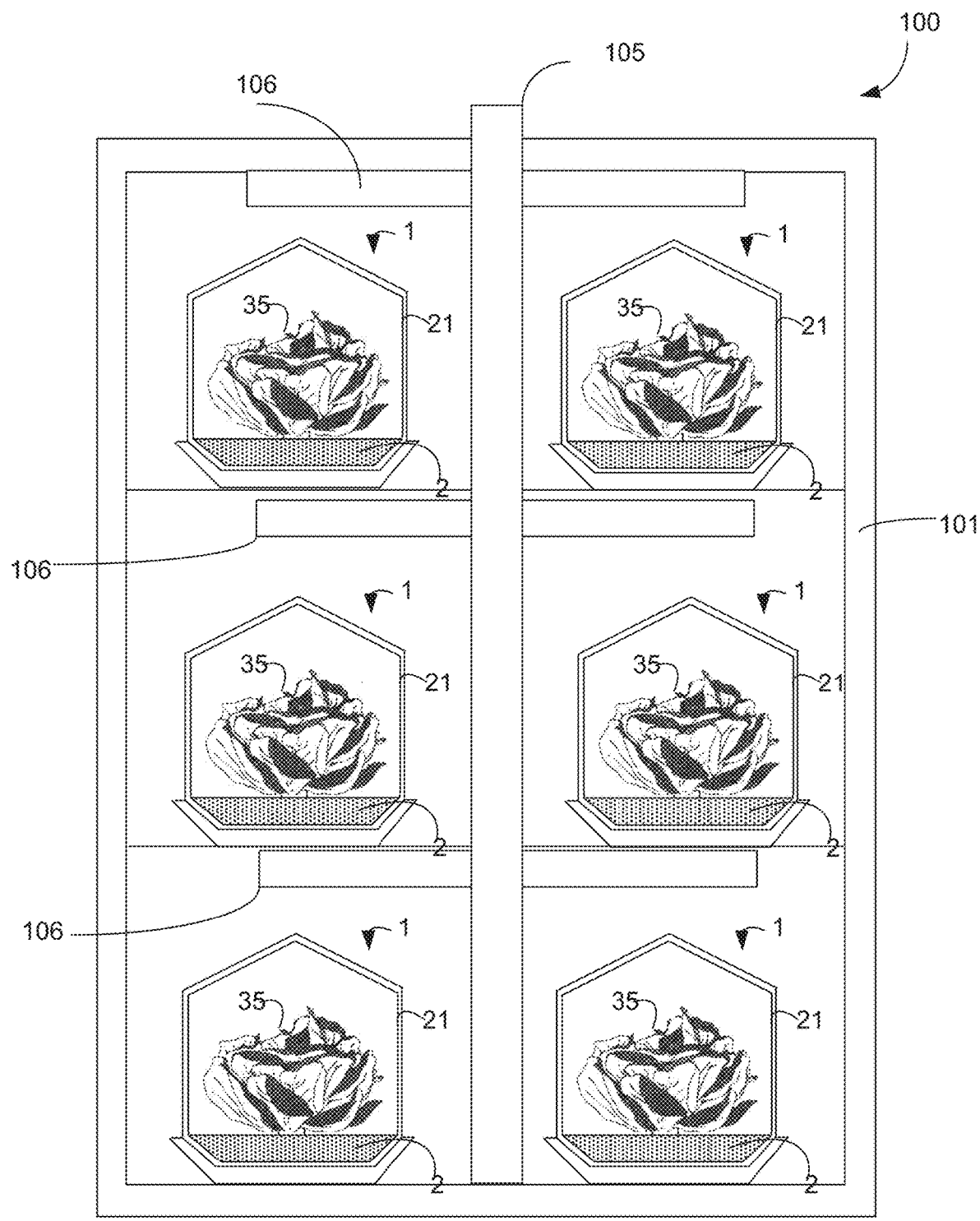
FIG. 1 schematically shows a system for producing a plant in an indoor environment.

FIG. 1 shows a system 100 for producing a plant in an indoor environment. In the embodiment shown, the system 100 comprises a cabin 101, a plurality of plant holders 1, a controller 105 and a light source 106. The cabin should be arranged in an indoor-environment, e.g. a room with a floor and walls, with a door and a ceiling. The cabin comprises a plurality of layers/stacks for arranging the plant holders at different heights (e.g. more than 15 plant holders per m$^3$), and is preferably equipped with wheels. The controller 105 may function as a temperature controller, and/or a humidity controller, and/or an air flow generator for generating a laminar flow on a surface of the plant holder. The system 100 may comprise a plurality of cabins 101. In an embodiment, the system comprises more than 100,000 plant holders.

The plant holder 1 comprises a plant 35, semi-permeable foil defining a non-planar boundary of an interior space and an exterior space, and a reservoir 2, confining an amount of liquid in the interior space for feeding the plant. In the embodiment shown, the semi-permeable foil is made in a form of a bag 21. Plural plant holders may share the same exterior space. In the embodiment shown, the semi-permeable foil defines the complete boundary of the interior space. The reservoir is thus arranged in the interior space. In another embodiment, the reservoir defines a boundary of the interior space. The semi-permeable foil and the reservoir 2 may both have a changeable shape (e.g. made of a flexible self-supporting material). A tray may be arranged under the plant holder for defining a shape of the semi-permeable foil and the reservoir. A water level in the reservoir 2 may be adjusted by putting the plant holder on a different tray.

The system 100 is arranged to grow plants in isolated interior spaces in the plant holders 1, by using a predetermined amount of liquid confined in the interior space (e.g. in the reservoir 2), without feeding with extra liquid from the exterior space throughout the growth of the plant, e.g. from cultivation through to offering to sale.

The controller 105 may be fixedly disposed in the space defined by cabin 101. The controller 105 may be plate-like and may be connected to a heating/cooling system to enable regulation of the temperature in cabin 1. In an embodiment the temperature controller 105 is hollow for the purpose of throughflow with a heat transfer medium. Additionally or alternatively, an electrical heating element may be used, which can be connected to an electrical power supply. In an embodiment, an electrical heating element is arranged in or on the plate-like controller 105, likewise to enable regulation of the temperature in cabin 1. The controller 105 can 9 be of the type as mainly known from WO-00/08922 and/or WO-2009/014422. As known from said publications, such a temperature controller can be utilized for heating, cooling and air distribution.

When growing a plant 35, the temperature should be set within a ranges to keep the plant healthy. The system 100 may comprise a ventilator, a heater, a cooler (and/or an air conditioning, etc) for optimizing and keeping the temperature precisely during the whole growth. The optimized temperature range depends on a type of the plant. For example, for lettuce the preferred temperature range may be set in a range between 15° C. and 20° C. In general the temperature may be set in a range between 15° C. and 25° C. for growing the plant. A humidity controller, which may be integrated with the temperature 105 or as a stand-alone controller, may be provided.

The plant generally consumes the liquid and releases water vapor in the interior space. The semi-permeable foil 20 and the controller 105 may be arranged to allow water vapor to pass the non-planar boundary at a controlled rate, (e.g. by adjusting the temperature in the indoor-environment, the humidity in the exterior space, and/or the permeation of water of the semi-permeable foil 20), e.g. such that the amount of liquid in the interior space decreases in a rate of 10-30 ml per 24 hours, and/or such that the interior space has a relative humidity more than 10% RH than a relative humidity in the exterior space. In an embodiment, relative humidity is less than 65% RH in the exterior space and is more than 75% RH in the interior space. Preferably, the humidity in the interior space is in a range of 90-95% RH, and is lower than 50, 55 or 60% RH in the exterior space. In general, fungi may start to grow when the humidity is higher than 65% RH. Keeping the humidity in the exterior space sufficiently lower than this this value (e.g. 55% RH) may be desired. The system 100 may comprise a ventilator (now shown) for releasing water vapor from the exterior space to an out-door environment. To maintain a low humidity (e.g. 55% RH), a power of the ventilator may need to be increased comparing to higher humidity (e.g. 60% RH).

Light fittings 106 may be arranged on either side of a temperature controller 105. Light fittings 106 can be formed as profiles with LED light sources therein. When LED light sources are used, the wavelength or the frequency of the light can usually be chosen or set accurately for the photo synthesis process.

Figure 2:
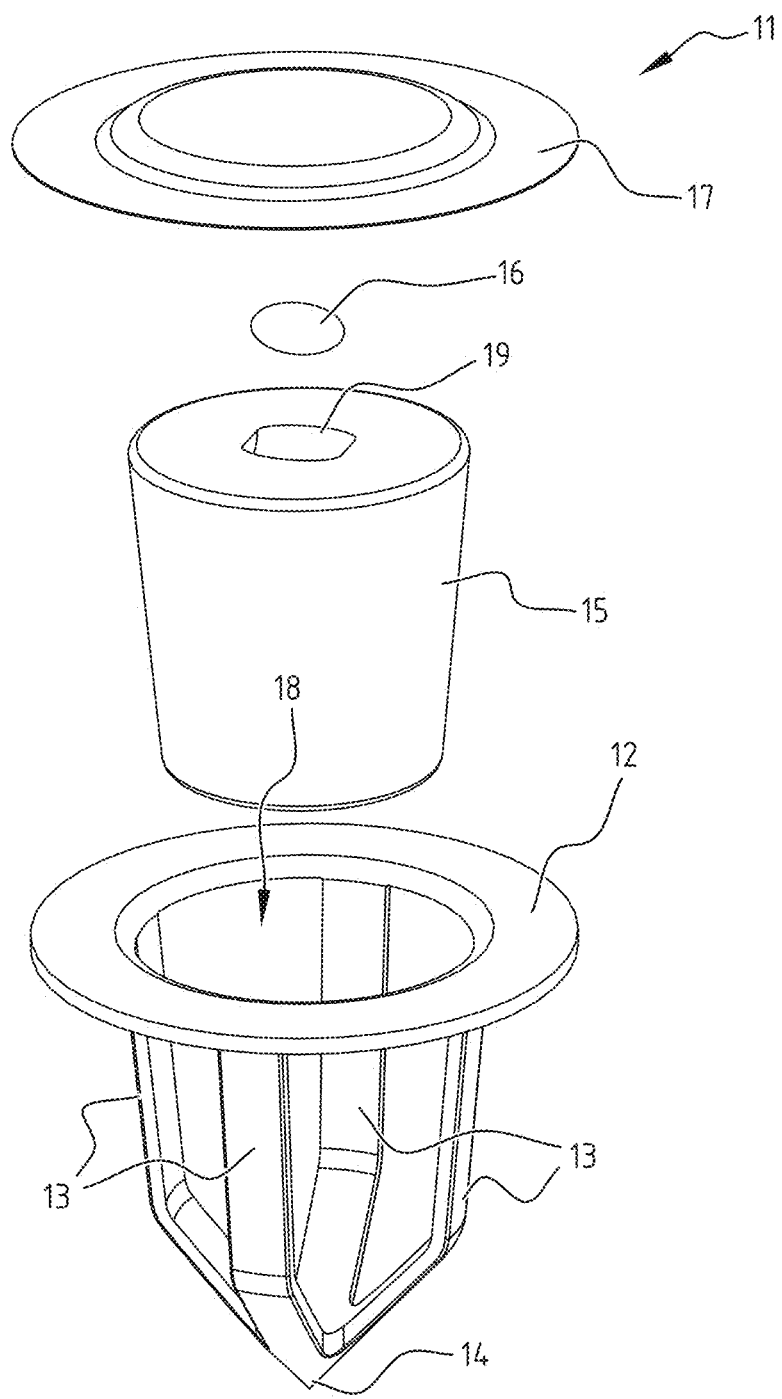
FIG. 2 shows a sub assembly of an injector plug with substrate and plant material.

FIG. 2 shows an embodiment of an injector plug 11 for planting or seeding the plant, e.g. in the system 100 and/or in the plant holder 1. In the embodiment shown, the injector plug 11 comprises a hollow 19 for carrying a seed or a plant, a housing defining a space 18 for accommodating a plant substrate 15 or a wick string, and a rigid tip 14. The injector plug 11 may comprise a ring 12 functioning as a stop when the injector plug is inserted through a surface.

The housing may be arranged in a form of a plurality of downward oriented legs 13, converging at the tip 14. A gap between the downward oriented legs 13 may be arranged to allow the liquid to be supplied to the seed 16 (or a plant germinated from the seed 16). A further ring 17 may be accommodated on or attached to ring 12 for fixing/coupling the plant substrate 15 or the wick string, e.g. to keep the block of substrate 15/wick string in place in the space 18.

In an embodiment where a rolled up wick string is accommodated in the injector plug 11, an end of such a string may contact plant material on top of the foil or plate 4 (not shown).

Figure 3:
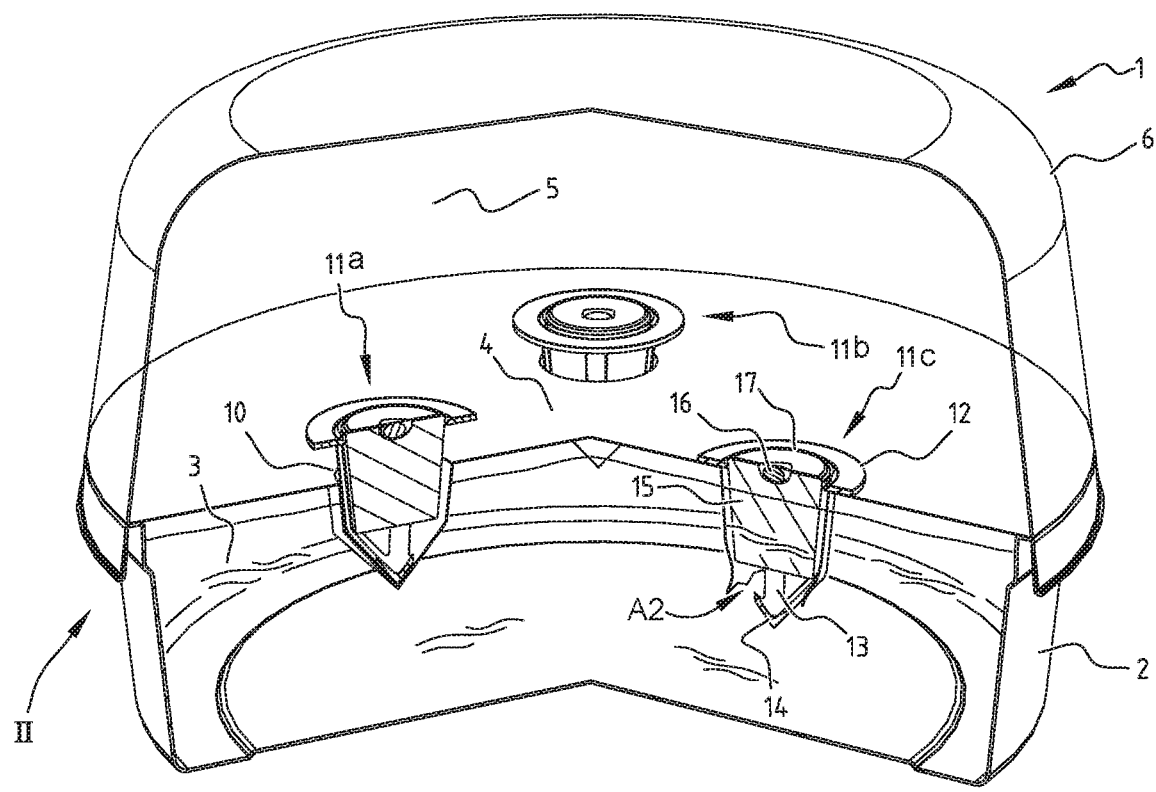
FIG. 3 shows a partially cut away perspective view of a first embodiment of a plant holder according to the present disclosure.

FIG. 3 shows a cut-away sectional view of an embodiment of a plant holder 1. The plant holder 1 comprises a reservoir 2 confining an amount of liquid 3, a closing cap (e.g. an inverted bowl 6) for defining a non-planar boundary of an interior space of the plant holder 1, and an injector plug 11. The injector plug 11 may include features as described above under FIG. 2. In the embodiment shown, once the injector plug 11c is plugged into the reservoir, the tip 14 is immersed in the liquid for supplying the liquid to the seed 16 or the plant grown from the seed 16, as shown in arrow A2.

The reservoir 2 may comprise a separation (e.g. a foil or plate 4), arranged to define a closed liquid space. Such a foil or plate may form the separation between the liquid space in the reservoir 2 and a room above the foil or plate 4. This room above the soil or plate 4 is enclosed by the closing cap. The closing cap may be a semi-permeable foil or in the form of an inverted bowl 6. The foil or plate 4, forming the separation, is preferably essentially impermeable to fluid, pathogens, other contaminations such as micro-organisms. The separation may be permeable to water vapor and/or oxygen.

The liquid 3 may be water or any other suitable liquid, potentially containing additives like nutrients, herbicides and/or pesticides, or the like.

The foil or plate 4 may comprise recesses 10 forming accommodations for the injector plugs 11, of which three are shown in FIG. 3. The three injector plugs 11a-c are shown in FIG. 3 in distinct stages of being inserted into (through) the foil or plate 4 at the recesses 10 of the foil or plate 4.

An embodiment of seeding or planting by using the injector plug 11 is also shown in FIG. 3. The rightmost injector plug 11c is fully depressed into or through the foil or plate 4 to a position, where ring 12 abuts the foil or plate 4. Only when the material at the base of recesses 10 is breached by the inserting movement of injector plug 11, will water or other liquid in the reservoir 2 be able to reach substrate 15, whereby germination of the seed 16 in the injector plug 11 is initiated.

If a rigid bowl 6 is used as the closing cap, when inserting any one, more than one or all of the injector plugs 11 in the configuration of FIG. 3 through the foil or plate 4, the bowl 6 needs to be lifted up. Thereafter, an end user, consumer or professional grower has a choice which one, more than one or whether all of the injector plugs 11a are desired to be pressed through the bases of the recesses 10, through the foil or plate 4, to allow water to reach the substrate 15 and two thereby initiate germination of seed 16 or growth development of the plant material in general in the injector plugs 11a.

Figure 8A:
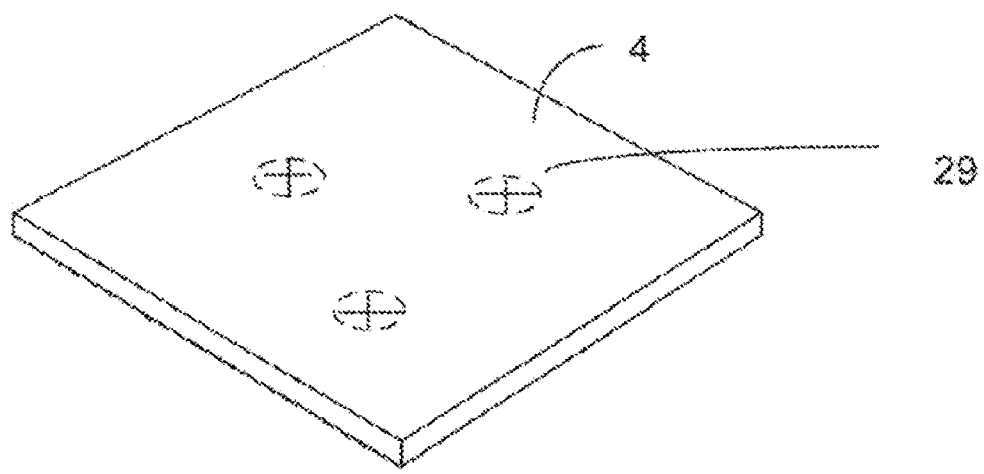
FIGS. 8A-8C show perspective views of embodiments according to an aspect of the invention.

The recesses 10, each for accommodating one of the injector plugs 11, are each oriented to extend into the reservoir and are normally closed, which is to say that water 3 in reservoir 2 is unable to penetrate into recesses 10 and is consequently also unable to reach the substrate 15. This is the situation of the left most injector plug 11a in FIG. 3. The left most injector plug 11a may be raised out of the recess 10 and rests on material at a basis of the recess 10. When the injector plug 11a is pressed into the recess 10, the beginning of which is shown for the middle injector plug 11b, a weakening, tear line, (e.g. as shown in FIG. 8A) or another equivalent feature, defining a breakthrough position in conjunction with the recess 10 itself, is strained to the point of tearing or breaking and allowing the injector plug 11b to be inserted through the foil or plate 4, as depicted for the rightmost injector plug 11c in FIG. 3. The recesses and more in particular the tear or break lines therein define an intended position for inserting the injector plugs 11 into the reservoir 2.

Before insertion of the injector plugs through the recesses 10 in particular and through the foil or plate 4 in general, the recesses should be watertight, including the break or tear lines arranged or provided therein.

Figure 4:
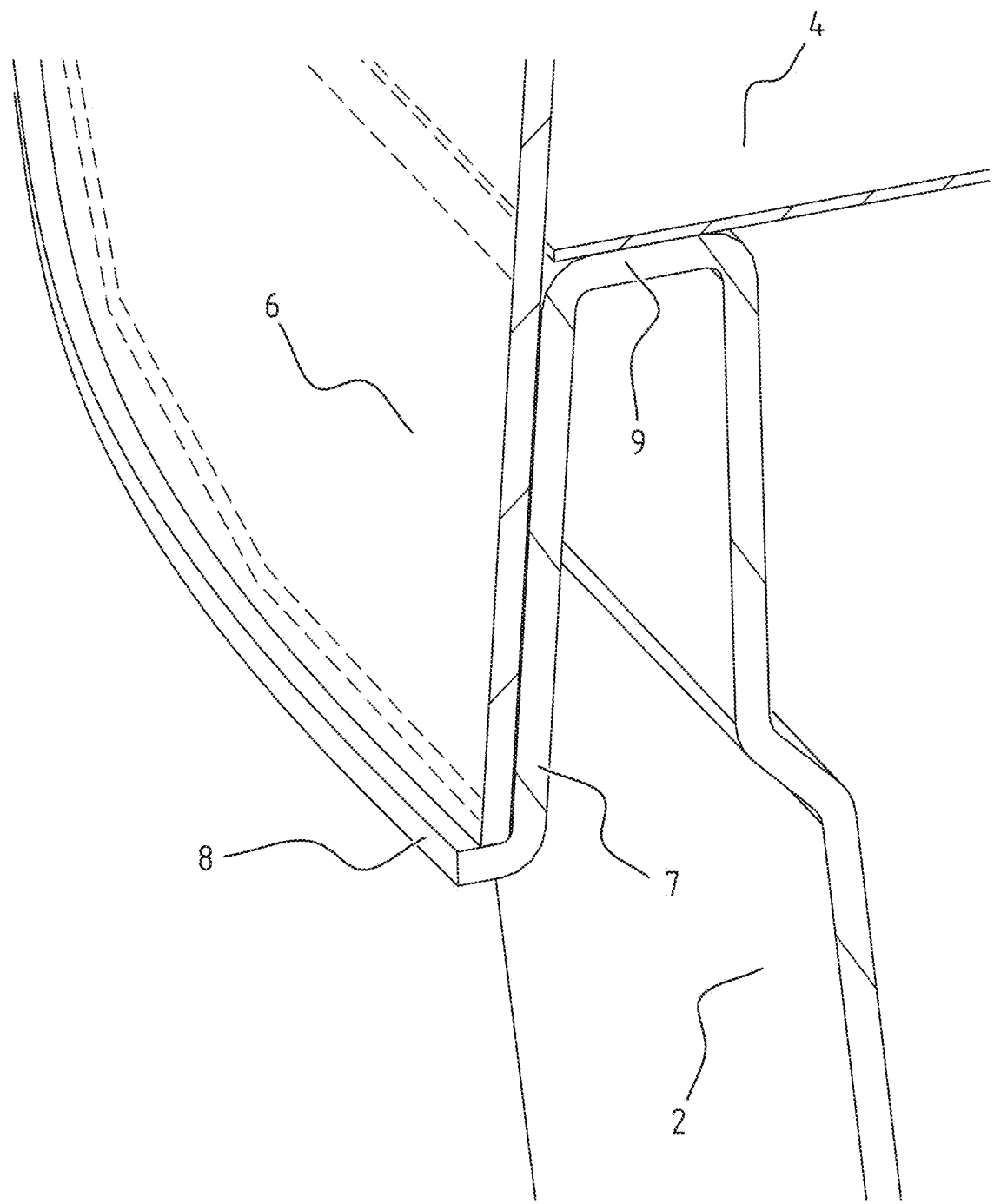
FIG. 4 shows a detail of the embodiment in FIG. 1 in accordance with arrow II therein.

FIG. 4 shows an embodiment of closing off the plant holder 1 by using a bowl 6 and a reservoir 2. The bowl 6 and the reservoir 2 may include features as described under FIG. 3. The bowl 6 extends to below a top edge 9 of the reservoir 2, along a down turned strip 7 having the shape of a truncated cone, and rests on a flange 9. As alternatives for the shown bowl 6, a lid, a box shaped cap or the like may be employed. Depending on the shape in top view of the reservoir, the shape of the closing cap may vary accordingly, preferably to ensure protection of the interior of the assembled plant holder 1 against invading detrimental influences, like microorganisms, unwanted gases, insects and the like. In general, a closing cap is designed to close fittingly engage either of the reservoir and the separation, for the same purpose. The closing cap may even be hingedly attached to either of the reservoir and the separation.

Figure 5A:
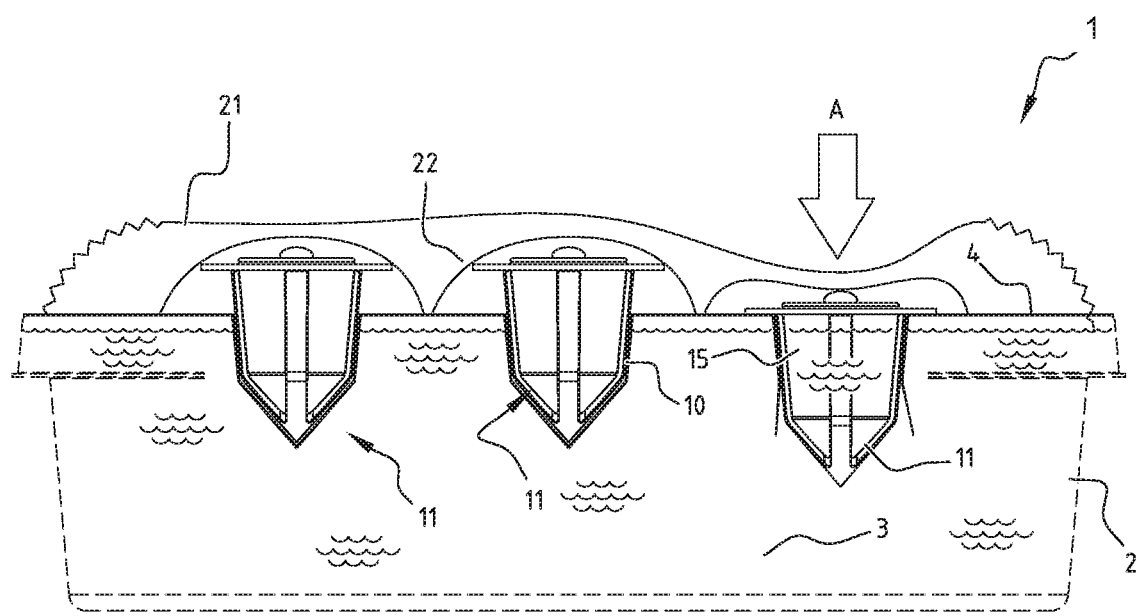
FIG. 5A and FIG. 5B show side sectional views of a second embodiment of a plant holder according to the present disclosure in distinct operational states.
Figure 5B:
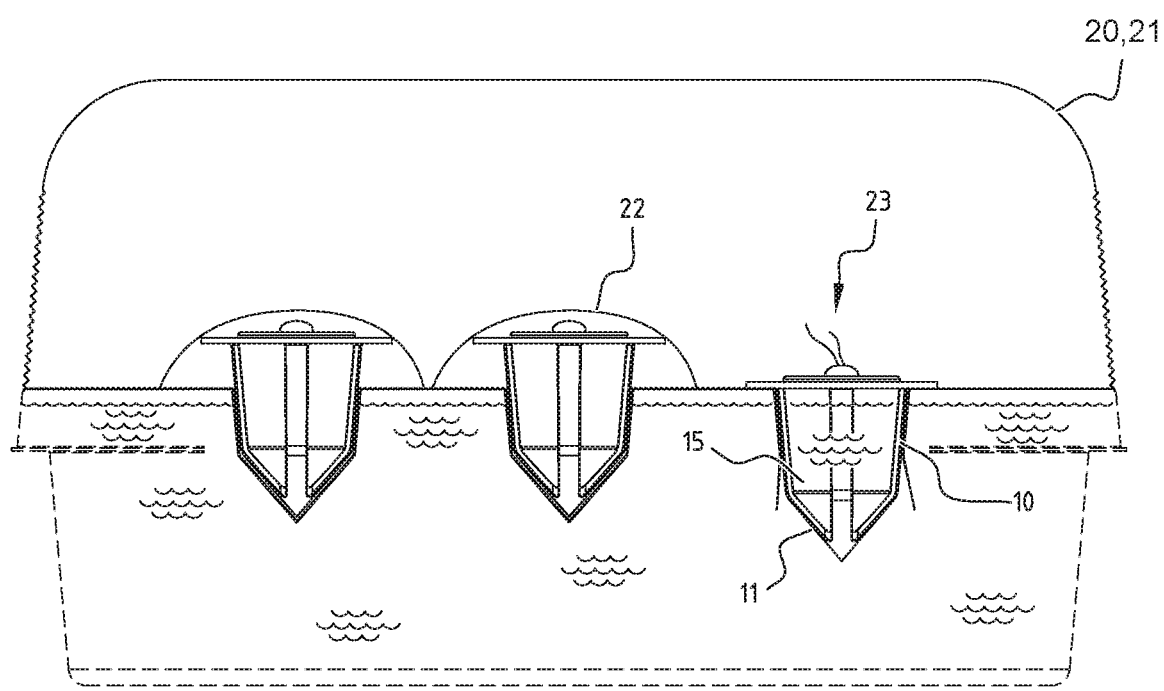

FIGS. 5A and 5B exhibit an alternative embodiment of a plant holder 1 relative to the one of FIG. 3, where the bowl 6 is replaced by a bag 21 having a collapsible, compressible bellows shape. The bag 21 may be made of a semi-permeable foil 20 which defines a non-planar boundary.

Further, in the embodiment of FIGS. 5A and 5B, a optionally water-soluble sheet 22 is arranged on the foil or plate 4 and over or the injector plugs 11. Such a sheet 22 may also be provided in the embodiment of FIG. 3, for instance to shield plant material in general and seed 16 in particular from direct contact with hands of an end user, consumer or professional grower. After insertion of a selected one of the injector plugs 11 through the foil or plate 4, and if the sheet 22 applied in the embodiment of FIG. 3 is water-soluble, sheet 22 will dissolve after insertion of the injector plug 11 through foil or plate 4 to expose germinating or developing plant material to the environment in the interior of a space defined by the reservoir 2 and the bowl 6.

When an end user, consumer or professional grower in the embodiment of FIGS. 5A and/or 5B applies pressure or exerts force in the direction of arrow A, bag 21 collapses or is compressed and the pressure is transferred to sheet 22 and subsequently also to a selected one of the injector plugs 11, to drive the injector plug 11 through the base of the recess 10. When, under this pressure in the direction of arrow A, recess 10 breaks, water 3 from reservoir 2 is able to penetrate into substrate 15 of the relevant one of the injector plugs 11. In an embodiment, wherein the sheet 22 is water-soluble, what are in or from substrate 15 will act on the sheet to solve the sheet 22 at the location of the injector plug 11. When the pressure in the direction of arrow A is released, bellows shaped bag 21 returns to an original rest state as depicted in FIG. 5B, at which time or thereafter sheet 22 at the location of the relevant one of the injector plugs 11 will dissolve or have solved under influence of the water or other liquid in substrate 15, exposing developing plant material 23 in injector plug 11 to the environment of the interior of the bag 21.

An end user, consumer or professional grower as a choice whether to activate plant material in a selected number of the injector plugs 11 or of all of the injector plugs 11. The only action required for such activation of the plant material in a selected injector plug 11 is to press on bag 21 at a location corresponding with a selected one of injector plugs 11. The bag 21 therefore does not need to be lifted up.

Sheet 22 may, in the embodiment of FIG. 3 is provided, and/or in the embodiment of FIG. 3 be tensioned over the separation. Thus, injector plugs 11 will be better held in their accommodations, formed by recesses 10, if the injector plugs are arranged between such a sheet 22 and the foil or plate 4.

In the embodiment of FIGS. 5A/5B, the bag 21 forming an embodiment of a closing cap, as well as sheet 22 form a press arranged to insert the injector plug through the separator. Any alternative embodiment of such a press is also possible within the context of the present disclosure. For instance, a hinged plate could be used to simultaneously insert all of the injector plugs 11 through separation 4, when turning such a plate downward onto the injector plugs 11. It goes without saying that as a consequence of the rotational movement of such a hinged plate, injector plugs 11 will not be inserted precisely simultaneously through separation 4, but in a sequence.

Figure 6:
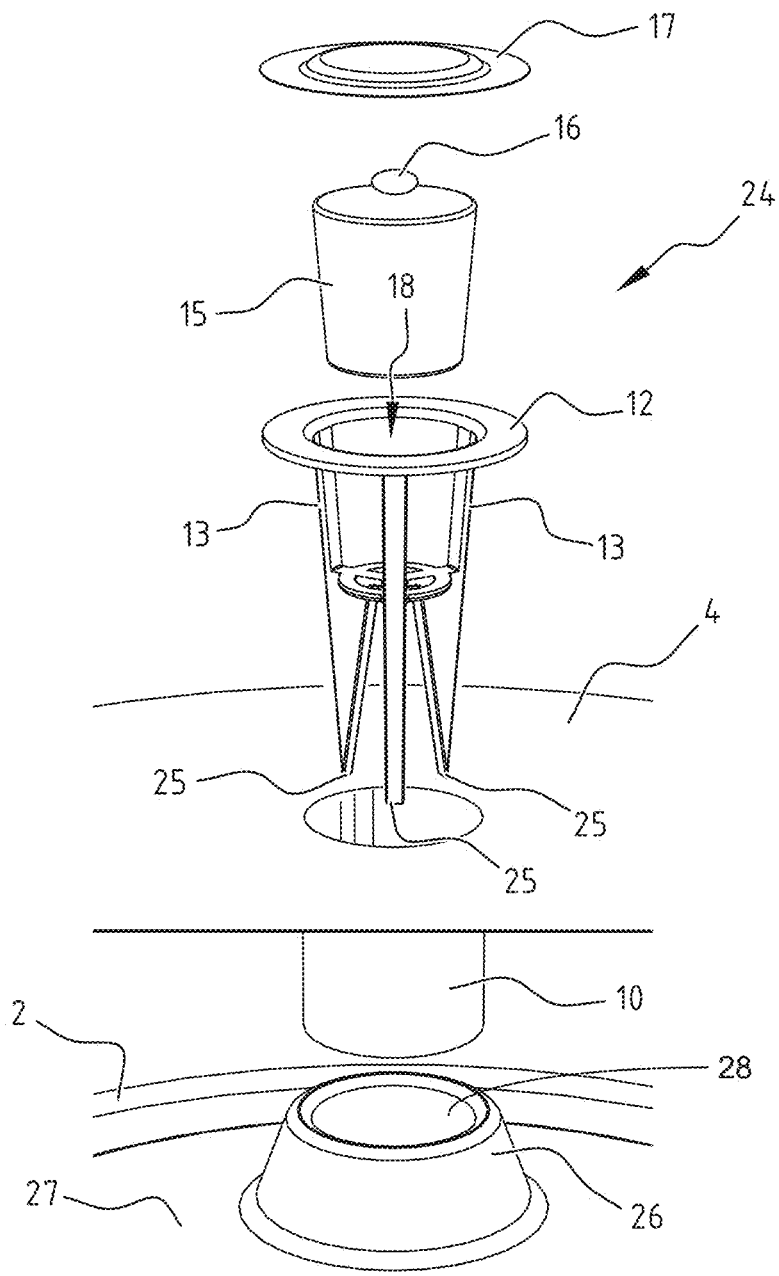
FIG. 6 shows an alternative sub assembly of an injector plug.

FIG. 6 exhibits an injector plug 24 as an alternative for injector plugs 11. Therein, each of legs 13, here three in number, extends downward to a tip 25. The three tips 25 rest, before insertion of the injector plug 24 through a base or bottom of recess 10, on this base or bottom of recess 10. A plug stand 26 is provided on a bottom 27 of reservoir 2. The reservoir 2 may comprise one or more plug stands 26, extending from a bottom 27 of the reservoir for accepting a tip 25 of the injector plug. In the embodiment shown, the tips 25 of the injector plug 24 are pressed into the plug stand 26, when injector plug 24 is inserted into the reservoir through the separation 4. The plug stand 26 may comprise a recess, arranged to accommodate the tip 25 of the injector plug.

Figure 7A:
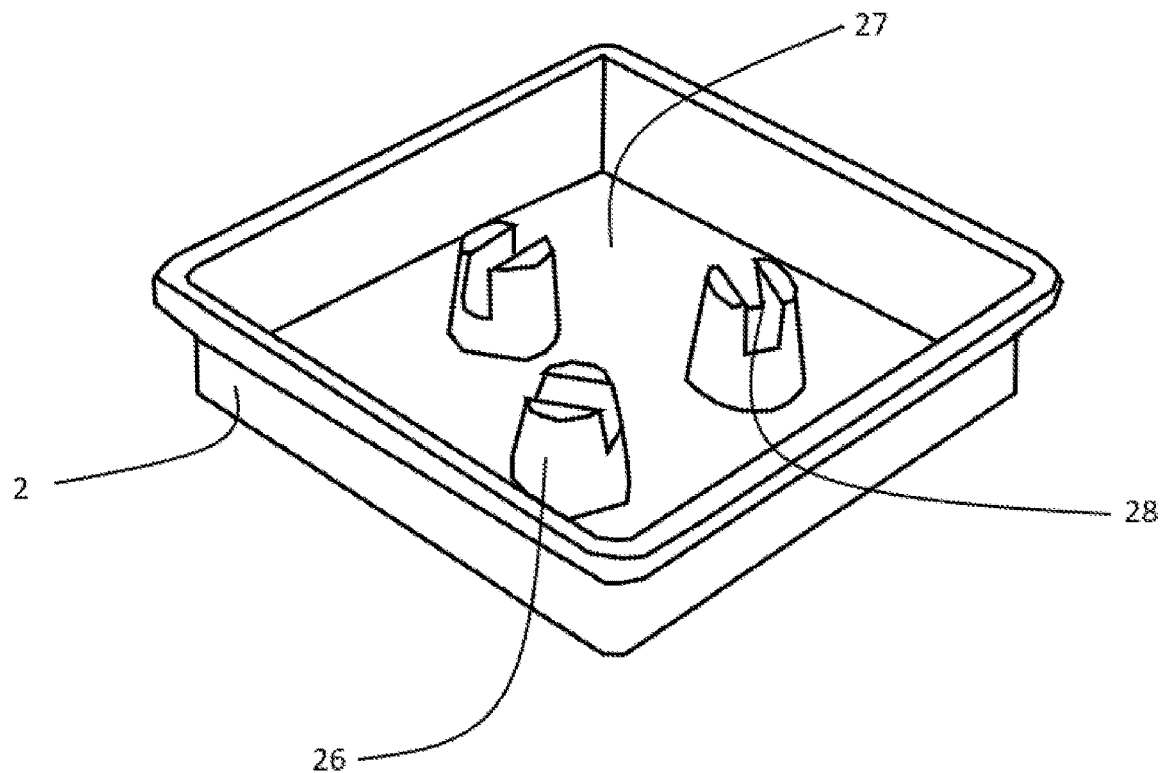
FIGS. 7A-B presents perspective views of embodiments according to an aspect of the invention.
Figure 7B:
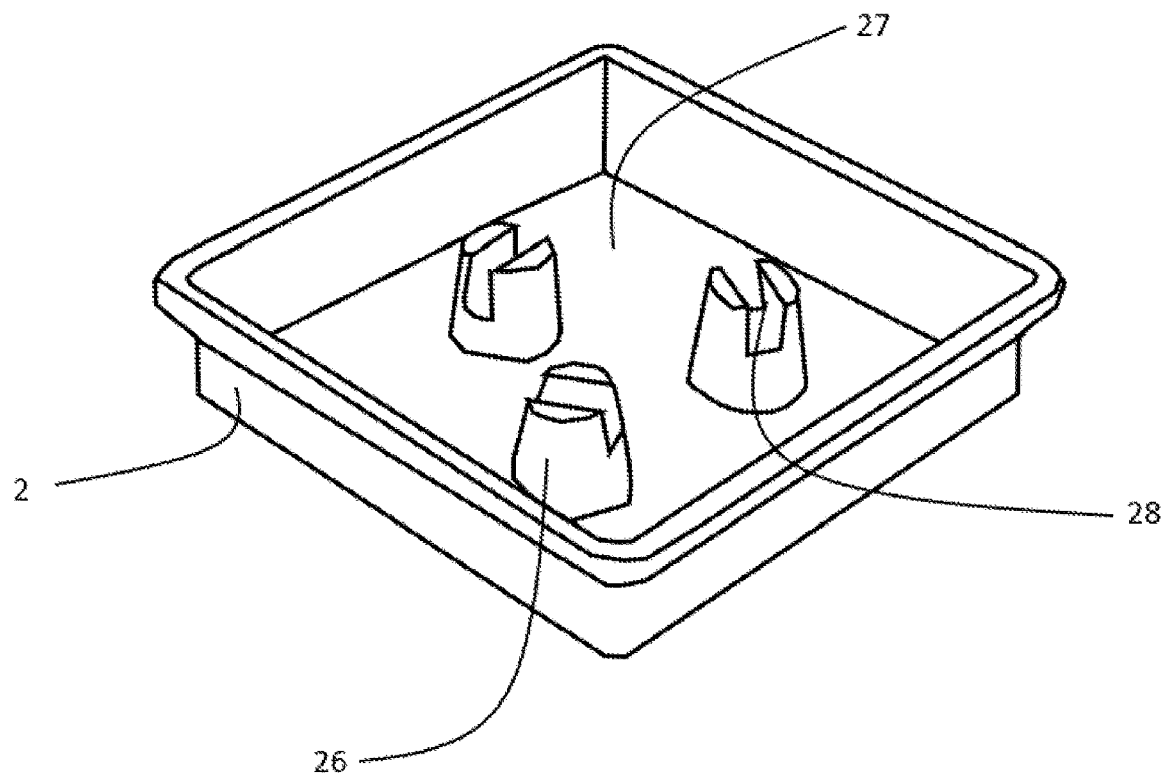

FIGS. 7A and 7B shows embodiments of the reservoir 2, comprising a plurality of plug stands 26 for accepting the tip of the injector plug 11. The plug stand 26 may comprise feature as described under FIG. 6. The reservoir 2 and the injector plug 11 may include features as described in any one of the preceding figures. The plug stand 26 is arranged to fix a position of the injector plug 11, once the injector plug 11 is plugged onto the plug stand 26.

FIG. 7A shows a reservoir 2 for planting a plant having roots (e.g. a plant that has been growing for a certain period). The plug stand 26 comprises a recess 28, arranged to define an open space for the roots to grow.

When inserting Such a plant, it is advantageous that the recess 28 provides some space for accommodating the roots. As a result, the roots are not injured when the injector plug 11 is plugged onto the plug stand 26.

FIG. 7B shows another embodiment of the reservoir 2 for seeding. In this embodiment, the plug stand 26 is arranged to dimension the reservoir to contain sufficient liquid for feeding to the plant from seeding through to offering to sale. The plug stand 26 may occupy a space less than 4 cm$^3$.

Figure 8B:
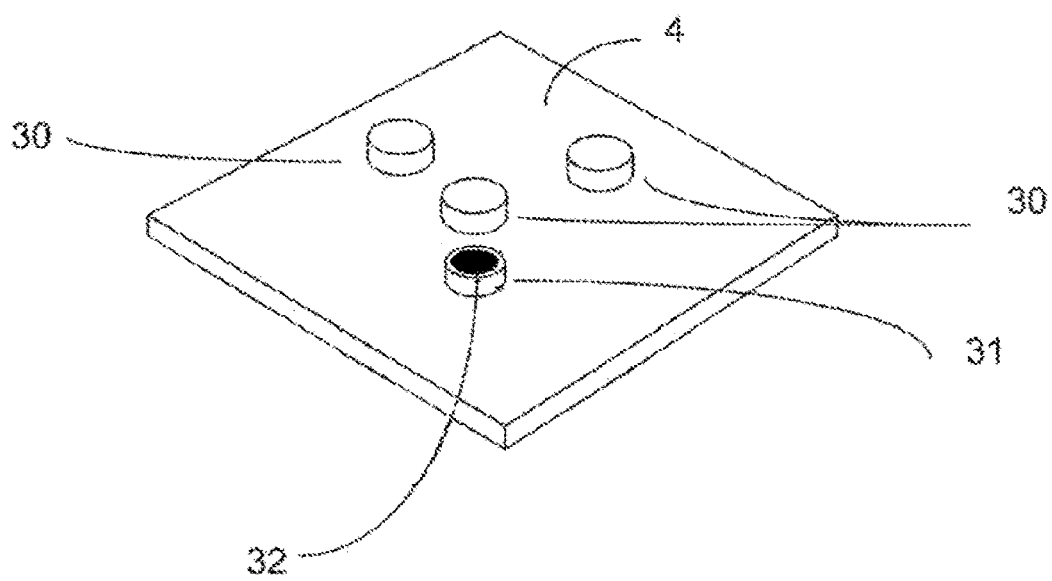
Figure 8C:
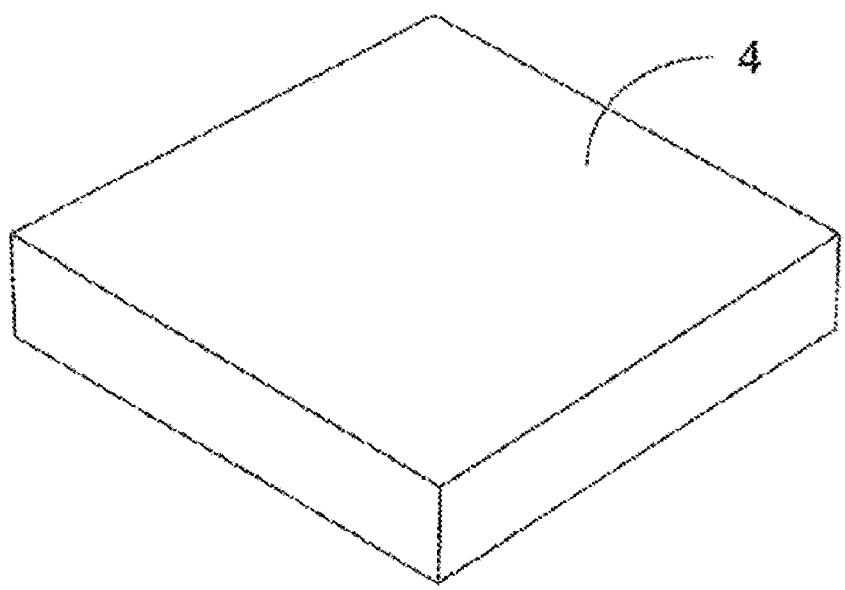

FIGS. 8A-8C show embodiments of the separation 4. Elements of FIG. 3 and FIGS. 5A-5B, such as the recess 10 and/or tear or break lines may also be included to define an intended position for inserting the injector plugs 11 into the reservoir 2.

FIG. 8A shows an embodiment where one or more crosses 29 are arranged on the separation 4. These crosses may define the intended position for inserting the injector plug 11. In the embodiment shown there are three crosses 29. The recess 10 (now shown) may be arranged underneath the cross 29. The separation 4 is preferably made of elastic material, such that the cross is substantially closed when the injector plug 11 is not inserted. This way provides a simple arrangement to achieve a separation 4 which is close when not in use, while it can be opened by simply plugging the injector plug 11 through the cross 29.

FIG. 8B shows an embodiment where the intended portion is defined by a screw cap 30 with an associated screw 31, which surrounds an opening 32. The screw cap 30 can be removed right before plugging the plant. Then the plant can be plugged through the opening 32. The injector plug 11 may be arranged to have a size (e.g. a cross-section area, a radius, etc) corresponding to the shape of the opening 32.

FIG. 8C shows an embodiment where the reservoir 2 is enclosed by a bag or a balloon. In an embodiment, the reservoir 2 is integrated with the bag/balloon. The bag/balloon may be made of a material that a grower can break through its surface by plugging the injector plug 11 through the surface. The reservoir bag 2 may be made of a foil having a thickness between 80-200 μm.

The reservoir bag/balloon may be made of a flexible material, so that the shape of the reservoir bag/balloon can be adapted to the growth stage of the plant. At an early stage (e.g. germination of seeds/young plants), it is important for the plant to get water. In that case, therefore, the shape of the reservoir bag may be configured that it has a larger height and a narrower length and width, so that the water level is high. As the roots grow, it may be less important to have a high water level, while it becomes more important to provide a wider space from the plant to grow. In that case, the shape of the reservoir bag can be made wider but shorter.

Figure 9A:
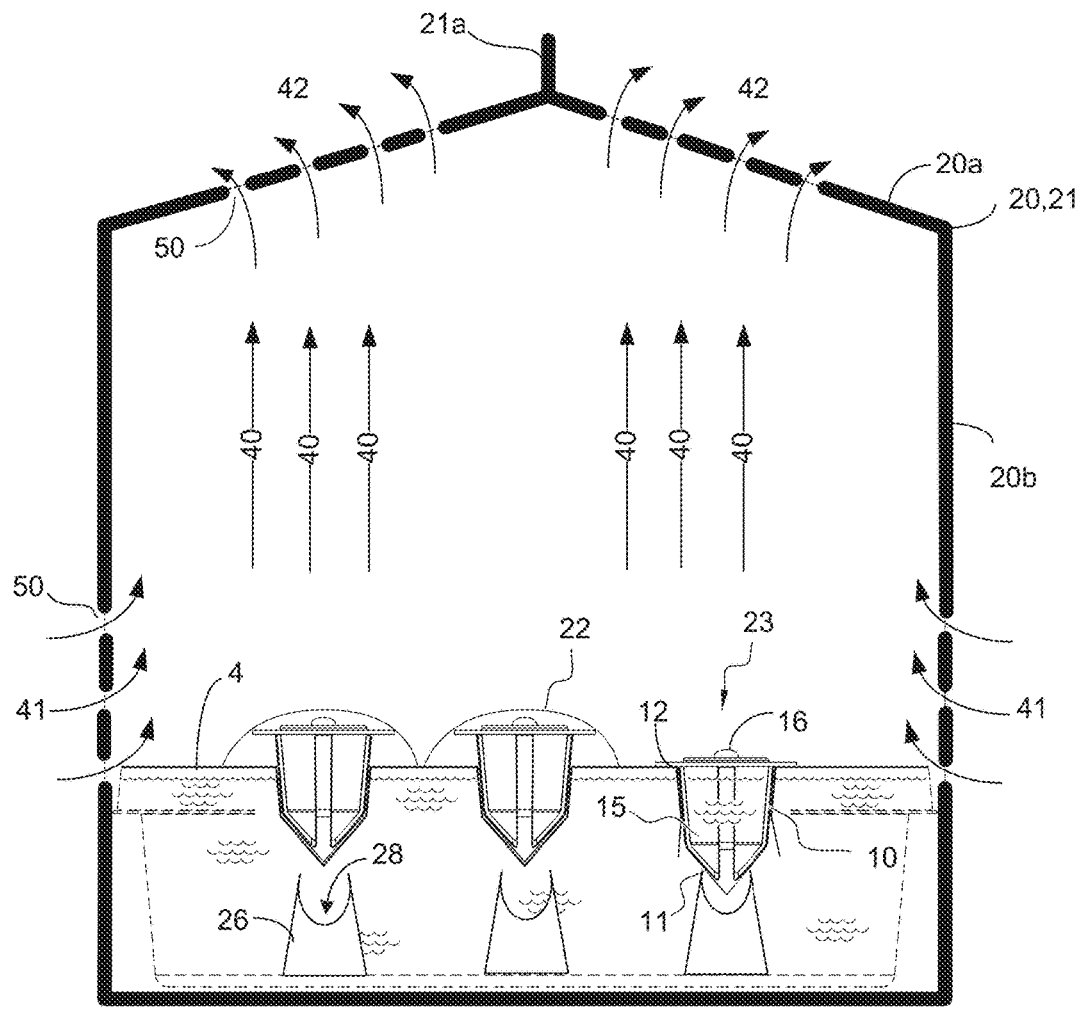
FIGS. 9A-9B shows a side sectional view of a further embodiment of a plant holder according to a further aspect of the invention.

FIG. 9A shows another embodiment of the plant holder 1, wherein the semi-permeable foil 20 is arranged in a form of the bag 21 for defining a hollow for covering the plant. The non-planar boundary comprises an apex-portion 20a (e.g. a roof-like shape) and a lateral portion 20b. In the embodiment shown, the semi-permeable foil 20 forms a complete boundary of the interior space, having a house-like shape, enclosing a reservoir 2 and a plurality of injector plugs 11. The apex-portion 20a is arranged to function as an outlet of air and/or water vapor, and the lateral portion 21b is arranged to function as an inlet of air and/or water vapor. The plant holder 1 is thus arranged to generate an air circulation within the interior space. The semi-permeability functionality and/or the inlet/outlet functionality may be achieved by arranging a plurality of perforations 50 on the bag 21. The bag 21 may comprise a handle portion 21a for carrying the bag for transport, and for adjusting a volume of the interior space. The semi-permeable foil 20 has a thickness. The embodiment of FIG. 9A may comprise the same or similar elements of any one of the preceding figures, and may be used in the system described under FIG. 1.

In the embodiment of FIG. 9A, the bag 21 is made of a semi-permeable foil 20 which defines a non-planar boundary. The semi-permeable foil has preferably permeation of water vapor, oxygen and $CO_2$. The permeation of water vapor may be such that, in a temperature range suitable for growing plants (e.g. 15-25° C.), relative humidity is less than 65% RH in the exterior space and is more than 75% RH in the interior space. In an embodiment, the humidity in the interior space is in a range of 90-95% RH, and is lower than 60% RH in the exterior space.

The semi-permeable foil 20 reduces the risk that pathogens comes into and goes out from the interior space. Therefore, the risk of cross-infections are reduced.

In the embodiment shown, the bag 21 forms a non-planar boundary of the plant holder 1. The bag 21 comprises plurality of faces (in the apex-portion 20a and the lateral portion 21b) that are not co-planar to each other. In another embodiment, a single face/side is already not planar. This makes it possible for the plant holder 1 to exchange air/vapor at different height. As a result, a so-called chimney effect may take place, which improves the air/vapor circulation in the plant holder 1.

Chimney effect (e.g. stack effect) is typically a movement of air into and out of buildings, chimneys, flue gas stacks, or other containers. It typically results from a temperature difference. For instance, in tall buildings during the summer season, the warmer indoor air rises up through the building and escapes at the top either through open windows, ventilation openings, or unintentional holes in ceilings, like ceiling fans and recessed lights. The rising warm air reduces the pressure in the base of the building, drawing cold air in through either open doors, windows, or other openings and leakage. In addition to a temperature difference, a difference in humidity also causes air to rise or sink because moist air is lighter than dry air. Therefore, moist air of the same temperature as dry air rises because it is less dense than the dry air.

Such an air flow can be caused by a difference in humidity. Since the humidity inside the plant holder 1 is higher than the humidity outside the plant holder 1 (e.g. in the cabin 101), the chimney effect takes place. As the plant consumes liquid and evaporates water vapor, below a surface of the apex portion of the semi-permeable foil 20 (thus inside the interior space), the humidity is considerably higher than the humidity above the surface (outside the interior space). Moist air thus goes up and exits the plant holder 1, as shown in arrows 42. Accordingly, air and/or vapor rises inside the plant holder, as shown in arrows 40. Also, dry air comes into the plant holder 1, as shown in arrows 41. This improves the circulation in the plant holder 1. A similar effect can take place in the embodiment of FIG. 5A/5B.

The perforations 50 preferably have a radius less than 100 µm for efficiently blocking pathogens. The perforations may be arranged in a quantity of (on average) 0.01 perforation per cm$^2$ to 1000 perforations per cm$^2$, depending on a desired permeation capacity, for instance in terms of quantities per unit of time. The perforations are preferably uniformly distributed on the foil. In that case, the circulation of the chimney effect may be optimized.

The growth of the plant can be controlled by carefully forming the perforations. The size of the holes determines permeation of oxygen, $CO_2$ and water vapor. In addition, the size of the holes determines the performance of blocking fungi and bacteria.

In the embodiment shown in FIG. 9A, the shape of the bag 21 is changeable (e.g. can be compressed and can be expanded). When fully expanded, the bag 21 may comprise a base area between 100-2500 cm$^2$, preferably between 200-900 cm$^2$. The base area may have a form of a square/rectangle having a length and/or a width between 10-50 cm$^2$, preferably in a range of 15-25 cm$^2$. A height from the base (bottom) to a highest point in the apex portion may be 20-50 cm. The reservoir 2 may have a depth between 30-70 cm.

The plug stand 26 may have a height of 30-50 cm, and a height of 10-20 cm at the recess portion. A distance between the plug stands 26 may be arranged in a range of 30-50 cm.

The chimney effect described above may be amplified/induced by providing a (e.g. constant) air flow, e.g. by using an air flow generator, which may be integrated with the temperature controller 105 in the system 100.

Figure 9B:
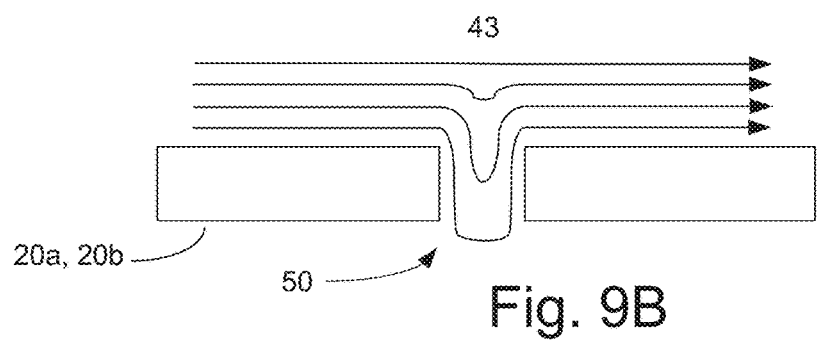

FIG. 9B shows an embodiment where the chimney effect can be amplified/optimized. In the embodiment shown, a square-root of the area of the perforations and the thickness of the semi-permeable foil 20 have a ratio between 0.65 and 1.35. When used in the system 100, the system preferably comprises an airflow generator for creating a laminar flow 43 on the semi-permeable foil, and the semi-permeable foil 20 having perforations having an open area in a range of between 0.004-0.02 mm$^2$, and/or a diameter of the perforation is in a range of 35-160 µm).

In the embodiment shown, the perforations effectively form a plurality of three-dimensional tunnels. In an embodiment, the square-root of the area of the perforations is 0.7-1.3 times of the thickness, e.g. the tunnels roughly have the same order of a diameter and a length. In the embodiment shown in FIG. 9B, when an air flow 43 meets the perforation, it continues to flow along a lateral boundary into a wall of the tunnel (perforation). At the preferred ratio (0.7-1.3) of the square-root of the open area of the perforations and the thickness, the air flow 43 may even flow a little bit into the interior space and then flows out. At an inlet, dry air is brought into the interior space when the laminar flow 43 goes into the perforation 50, and results in the air flow 41. At an outlet, moist air/water vapor is brought out from the interior space when the laminar flow 43 goes out from the perforation 50, and results in the air flow 42. It therefore creates an ideal environment to improve the ventilation. In an embodiment, an air distributor (e.g. which may be integrated with the temperature controller 105) is arranged to provide a constant air flow 43 having a speed of in a range of 0.9-1.1 m/s.

In an embodiment, the thickness of the semi-permeable foil 20 is 100±10 µm, and the diameter of each perforation is between 80-150 µm.

Departing from the preferred range of the ratio of the square-root of the area of the perforations and the semi-permeable foil thickness generally reduces the effect as described above. Increasing the ratio can be imagined as increasing a diameter of a round perforation without changing the thickness of the semi-permeable foil. On the one hand, when the preferred range is departed by increasing the diameter, the air flow around the center of each perforation becomes less controlled. and a spontaneous diffusion of water vapor through the perforations also becomes less controlled. On the other hand, a flow speed of the laminar flow 43 in the tunnel generally decreases with the diameter of the tunnel. When the preferred range is departed by decreasing the diameter, at a certain threshold the flow speed of the laminar flow 43 becomes zero. Thus, the effect shown in FIG. 9B vanishes when the ratio of the square-root of the area of the perforations and the semi-permeable foil thickness becomes too small.

In some embodiments, the water transport rate W (e.g. mL per 24 hours) in the reservoir 2 can approximately be determined by an equation $$W = W_0 \frac{A \times N}{e^{\frac{h}{h_0}} - 1}$$

where A is the surface area of each perforation, N is the total number of perforations on the semi-permeation foil 20, h is a thickness of the semi-permeation foil 20, and the proportion constant $W_0$ is a function of the temperature, the air-flow speed and the relative humidity in the exterior space. In general, such a water transport rate increases with the difference between humidity levels in the interior space and the exterior space. For instance, if the perforations have a round shape the area A of the perforation is replaced by the circle area in the equation.

In these embodiments, it can therefore be pre-determined how much water is needed until the plant is matured and put into transport, minimizing the risk that after a few weeks of growth it turns out that water is not enough. Thus, the plant holder needs not to be opened and the risk of contamination is reduced. One then only needs to add some additional water for the plant to consume during the transport. In this way, the plant can get sufficient water throughout the stages of growth, transport and being sold in the supermarket completed in the isolated interior space, and can grow even during the transport and even in the supermarket.

Figure 10:
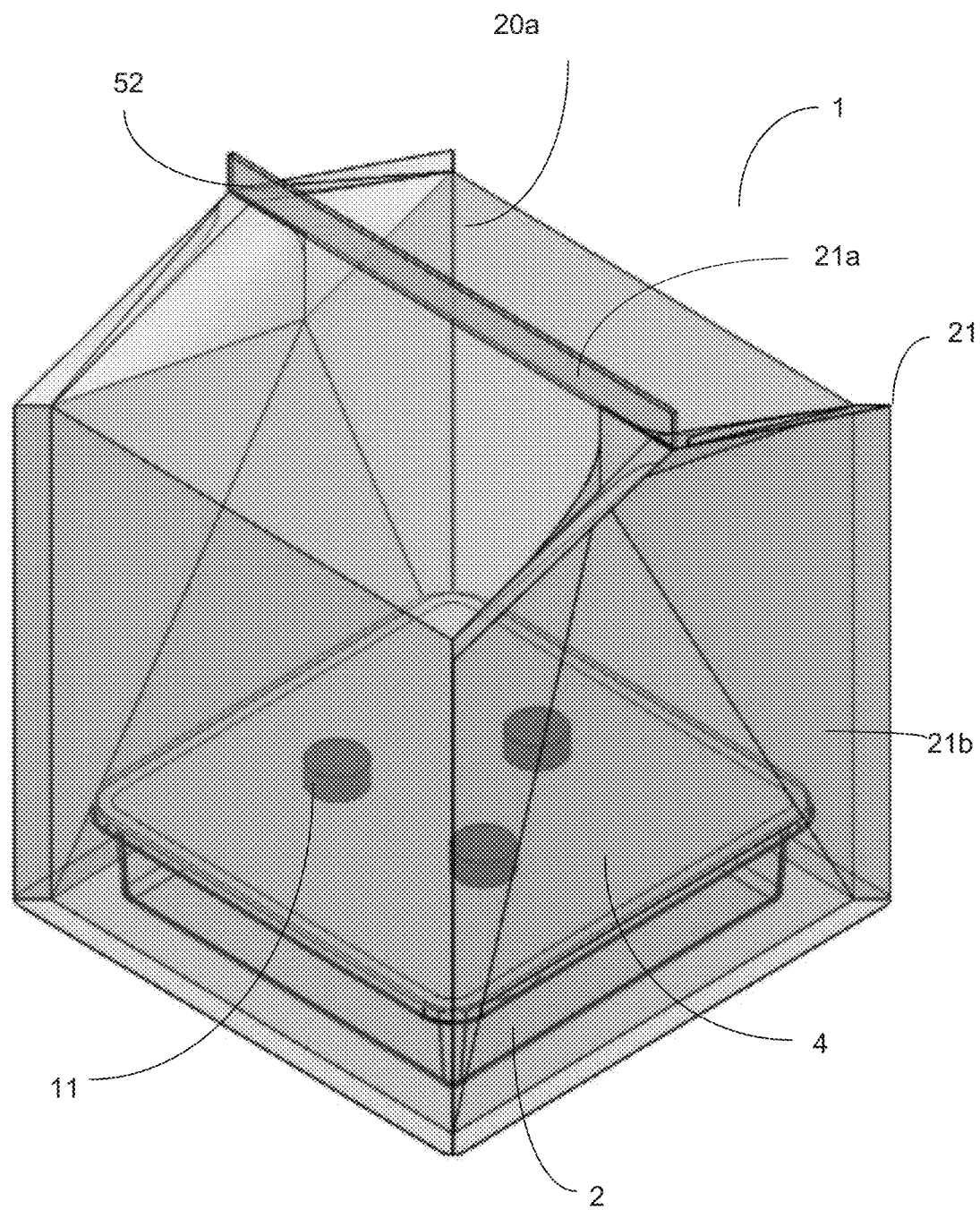
FIG. 10 shows a perspective view of the plant holder according to FIG. 9A.

FIG. 10 shows an embodiment comprising a semi-permeable foil 20, wherein the semi-permeable foil 20 comprises an apex portion 20a and a lateral portion 20b. Elements shown in FIGS. 5A, 5B and FIG. 9A, 9B may be included in this embodiment, and vice versa. A handle portion 21a is made of two or more layers of the semi-permeable foil 20. This makes it easier for the handle portion 21a to maintain its shape, and easier for carry and applying a force on it to adjust a volume of the interior space.

A ratio of the surface area between the apex portion and the lateral portion 20b may be less than 1/3. In the embodiment shown, the lateral portion 20b has four lateral faces, and the apex portion 20a has a shape like a triangular house roof. The lateral portion 20b expands a space along a height direction. This space improves the chimney effect, as the chimney effect typically concerns air going up or down. The chimney effect is in particular improved when perforations are (uniformly) spread over the lateral portion 20b. These perforations on the lateral portion 20b function like doors and windows in a building, where air comes in and goes up when the up-ward chimney effect takes place.

In the embodiment shown, the lateral portion 20b has a rectangular cross-section (e.g. in a top view). This may make the bag 21 easy to transport and saves space in the cabin 101.

The semi-permeable foil 20 according to any of the embodiments described above may be made of transparent material. The semi-permeable foil may be may also be made of white material (e.g. plastic), so that the light will reflect, which promotes growth. Perforations can be arranged on the foil with a hot-needle technique or with a laser. The laser method may be preferable to achieve a smaller and more accurate radius of the perforations.

The semi-permeable foil 20 according to any of the embodiments described above may be made of a self-supporting material for maintaining a shape, such that a volume of the interior space is changeable by applying a pressure or exerting a force on the bag. The volume of the interior space can thus be adjusted as the plant grows, preferably so large that the foil of the bag does not touch the plant. If the bag touches the plant, there is a risk that the leaves burn.

As in other embodiments, a wick (not shown) may extend through the injector plug 11 to improve water supply in a passage formed by the injector plug 11. The wick draws water from the reservoir 2 in order to better provide roots/seeds of the plant with water at an early stage of development than on the basis of evaporation alone.

Figure 11A:
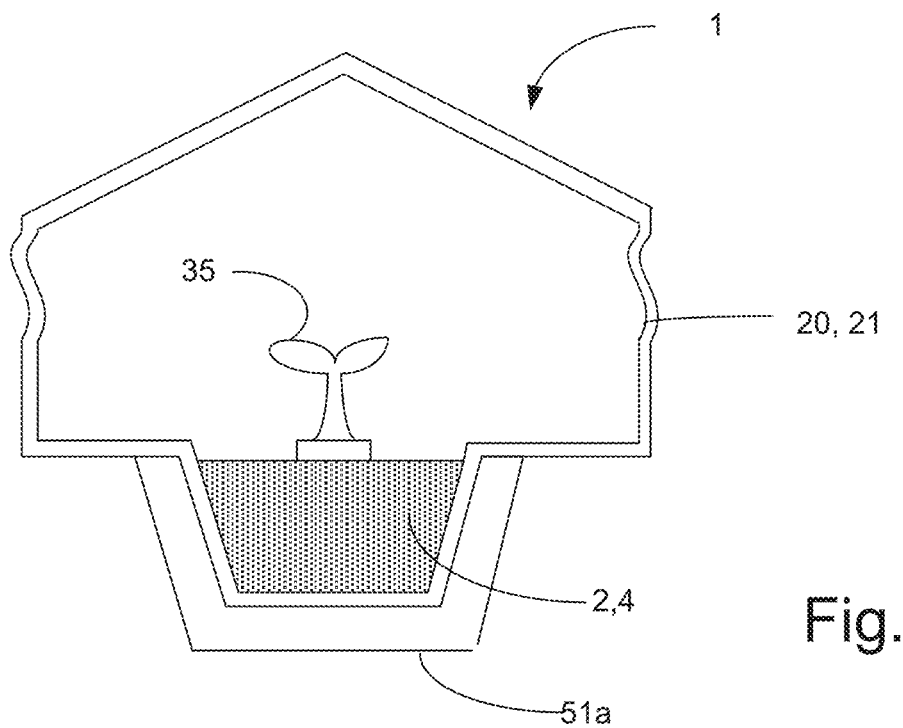
FIGS. 11A and 11B show cross-sectional views of another embodiment of a plant holder according to an aspect of the invention.
Figure 11B:
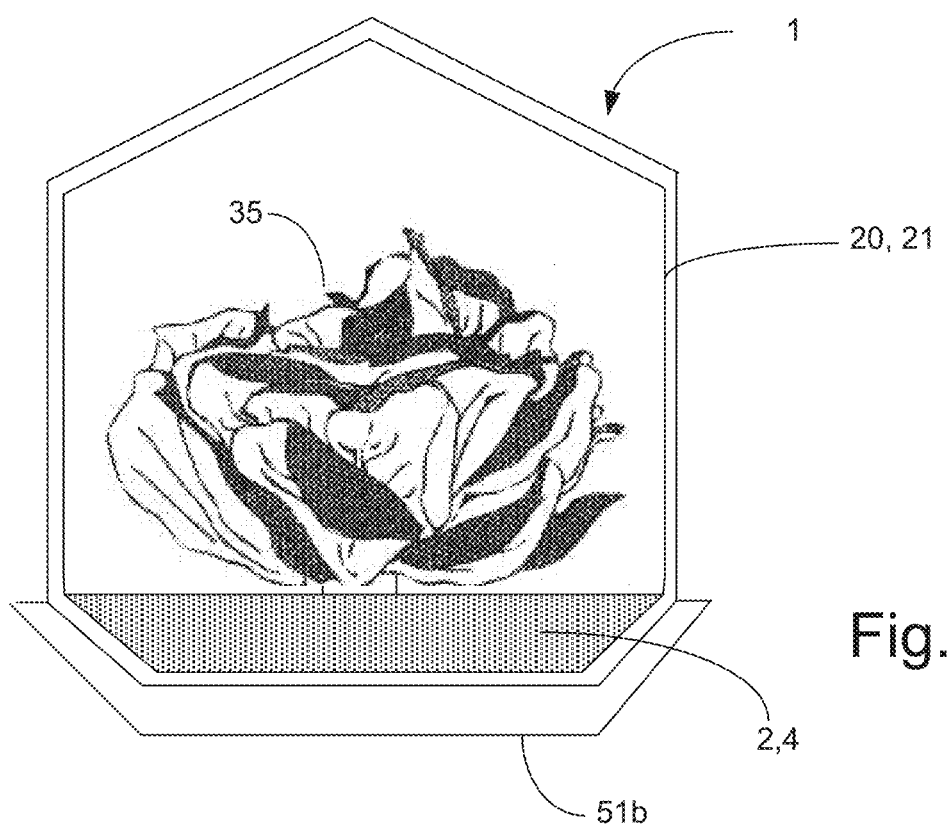

FIGS. 11A and 11B show an embodiment of the plant holder 1, which includes a bag 21 as described with FIGS. 5A/5B/9/10 and a reservoir as described with FIG. 8C.

The embodiment of FIG. 9A is particularly advantageous when using together with a reservoir according to FIG. 8C. The embodiment shown comprises two bags: the semi-perforation foil 20 and the integrated reservoir 2 and the separation 4 (e.g. a reservoir bag in FIG. 8C). The plant holder 1 thus comprises a 'bag in another bag'.

The plant holder 1 of such an embodiment has an advantage that the growth environment can be adjusted at all growth stages of the plant. In the embodiment shown, the reservoir bag is made of a flexible material, so that the shape of the reservoir bag can be adapted to the growth stage of the plant, together with the shape of the semi-permeable foil 20.

As shown in FIG. 11A, at an early stage (e.g. germination of seeds/young plants) the semi-permeable foil 20 and the reservoir bag (2,4) are arranged on a holder substrate 51a, which defines a shape of the semi-permeable foil 20, which in turn defines a shape of the reservoir bag. Both the shape of the apex portion and the lateral portion are preferably changeable. The holder substrate 51a has a (narrow) base such that the water level in the reservoir bag is high, so that the young plant 35 (or seeds) can get water. On the other hand, the semi-permeable foil 20 at this stage may be arranged such that it is not fully expanded, so that the volume of the interior space is adapted to the size of the plant.

As the roots grow, as shown in FIG. 11B, it becomes more important to provide a wider space from the plant to grow. In that case, the plant holder 1 can be moved to another holder substrate 51b, which has a wider base than 51a. The holder substrate 51b thus defines a shape of the semi-permeable foil 20 such that the interior space is sufficient wide for a matured plant 35 to grow. On the other hand, the grower can pull the semi-permeable foil 20 to fully expand it, to increase the volume of the interior space.

The plant holder 1 according to the embodiment of FIGS. 11A and 11B thus makes it possible to properly control not only temperature and humidity, but also water level and growing space. Thus a suitable growing environment can be achieved without transplanting, and even without opening the plant holder 1.

FIGS. 12A-12F show a flow chart of an embodiment to grow a plant in the plant holder 1. The elements described below may contain the same features as in the embodiments described above under FIGS. 1-11.

Figure 12A:
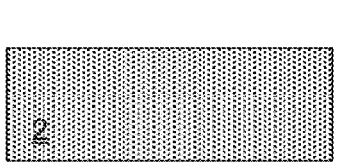
FIGS. 12A-12F show a flow chart of an embodiment from an initial preparation of a plant holder to a stage where the plant is fully grown.

As shown in FIG. 12A, the reservoir 2 is filled with fluid medium (e.g. water or liquid). The fluid medium may be sterilized. In that case the fluid medium is warm when filled. The reservoir 2 may then be cooled with the fluid medium. After the fluid medium cools down, the reservoir 2 is closed (e.g. sealed with the separation 4). In the case that the reservoir 2 and the separation 4 is integrated into a reservoir bag, an opening of the reservoir bag is closed/sealed. A reservoir 2 defining a close space comprising a pre-determined amount of liquid is thus provided. The closed reservoir 2 may then be stored (e.g. at a clean place) before use.

Figure 12B:
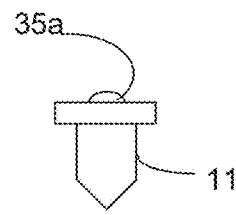

As shown in FIG. 12B, an injector plug 11 with a seed 35a (or a plant 35) is provided. This may be provided in parallel, e.g. before/after or simultaneously with providing the closed reservoir.

Figure 12C:
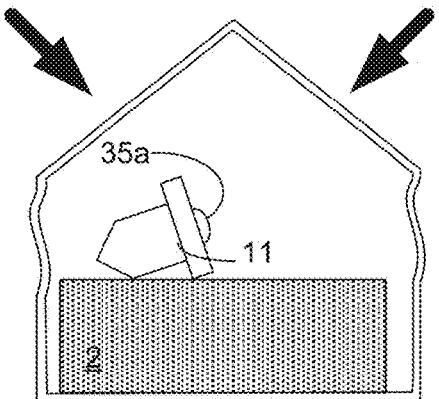

FIG. 12C shows an unplugged state of the plant holder of the invention. In the embodiment shown, the semi-permeable foil 20 forms a complete boundary of the interior space, wherein the reservoir is enclosed in the interior space. The reservoir itself is also closed and contains the liquid therein. The injector plug 11 is provided with a seed 35a or a young plant. In the unplugged state, the injector plug 11 is placed in the interior space for plugging through the separation.

In the embodiment shown in FIG. 12C, the bag 21 may be shaped to define a volume of the interior space of 800 (±50) cm³.

Sterilization may be applied multiple times, and may be applied at any one of the steps described above. Sterilization may be done by using steams or other means such as heating. At different steps the plant holder 1 may be sterilized in different ways. In an embodiment, states described in FIGS. 12A to 12C are done in a sterilized environment, e.g. a clean room.

Figure 12F:
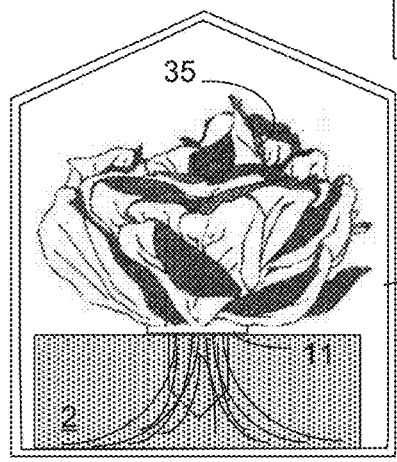
Figure 12D:
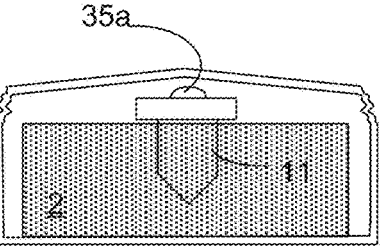

FIG. 12D shows an embodiment of a plugged state of the plant holder. The planting/seeding is done by plugging the injector plug 11 into the reservoir by applying a force on the semi-permeable foil 20/bag 21, in a similar way as shown in FIG. 5A. The plugging may be done after the plant holder is removed from a sterilized environment and shipped to a grower's place.

When a separation comprises a cross-shaped break-line 29 (e.g. FIG. 8A), the injector plug 11 may be plugged through the cross-shaped break-line 29. In the case of a screw cap (e.g. FIG. 8B), the screw cap is removed and the injector plug 11 is then plugged through the opening. In the case where a reservoir bag is used (e.g. FIG. 8C), the injector plug 11 is plugged through its surface. Thus, a plant is accommodated on the injector plug 11, which in turn stands through the separation of the reservoir.

Alternatively, the planting/seeding may be done by plugging the injector plug 11 into the reservoir before the semi-permeable foil 20 is arranged. Steps described under the context of previous drawings may be used. In the case where a separation comprises a cross-shaped break-line 29 (e.g. FIG. 8A), the injector plug 11 may be plugged through the cross-shaped break-line 29. In the case of a screw cap (e.g. FIG. 8B), the screw cap is removed and the injector plug 11 is then plugged through the opening. In the case where a reservoir bag is used (e.g. FIG. 8C), the injector plug 11 is plugged through its surface. Thus, a plant is accommodated on the injector plug 11, which in turn stands through the separation of the reservoir. In some embodiments, the bag 21 has an opening on the bottom side. In that case, the opening on the bottom side may be closed/sealed before or after the injector plug 11 is plugged. The bag is then closed (e.g. closing a sealing member 52 e.g. on the top of the bag 21). The interior space is thus formed, which contains the plant therein. At this stage, the bag 21 may be shaped to define a volume of the interior space of 800 (±50) cm³.

Figure 12E:
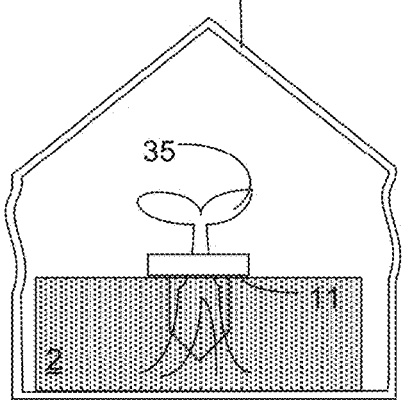

As shown in FIG. 12E, the seed 35a germinates into a young plant 35, or the plant 35 grows. The volume adjustment mechanism described under FIGS. 11A-11B may be applied. Roots of the plant 35 may also grow at this stage and extend into the liquid in the reservoir.

As shown in FIG. 12F, the plant 35 is fully grown. In some embodiments the shape of the reservoir may be adjusted according to FIG. 11B. At this stage, the shape of the bag 21 is preferably adjusted in accordance with FIGS. 11A and 11B, such that volume of the interior space reaches a maximum value of e.g. 125,000 (±100) cm³. In some embodiment, the amount of liquid may be pre-determined, such that there is a just amount of water left at this stage. With such an amount of water, the plant holder as a whole, comprising a matured/fully grown plant 35 and the reservoir 2, may be transported as a whole to the supermarket.

The descriptions above are intended to be illustrative, not limiting. It will be apparent to the person skilled in the art that alternative and equivalent embodiments of the invention can be conceived and reduced to practice, without departing from the scope of the invention, which is defined according to the claims set out below.

The invention claimed is:

1. A plant holder, comprising:
a reservoir having therein an amount of liquid;
a separation member arranged to define a closed liquid space in the reservoir to contain the liquid in the closed liquid space;
an injector plug arranged to carry a seed or a plant and comprising a plant substrate,
  wherein the separation member and injector plug are mutually arranged such to allow insertion of the injector plug through the separation member into the reservoir for exposing the plant substrate to the liquid,
  wherein the separation member is liquid-tight prior to injector plug insertion;
a semi-permeable foil defining a non-planar boundary of an interior space for growing a plant and an exterior space of the plant holder, the semi-permeable foil being permeable to water vapor and air, and arranged to block pathogens, the semi-permeable foil having at least two surface areas that are non planar with respect to each other such that the plant holder exchanges water vapor and air at different height,
  wherein the semi-permeable foil is adapted to be compressed for inserting the injector plug through the separation member and to be expanded thereafter,
  wherein the semi-permeable foil is adapted to allow being compressed by applying a pressure or exerting a force on the semi-permeable foil,
wherein the semi-permeable foil is made of a transparent material.

2. The plant holder according to claim 1, wherein the reservoir comprises one or more plug stands, extending from a bottom of the reservoir for accepting a tip of the injector plug, wherein the plug stand comprises a recess for accommodating the tip of the injector plug.

3. The plant holder according to claim 1, wherein the semi-permeable foil comprises:
a first group of perforations, arranged on a first surface area;
a second group of perforations, arranged on a second surface area.

4. The plant holder according to claim 3, wherein the first surface area and the second surface area are not co-planar.

5. The plant holder according to claim 3, wherein the first surface area and the second surface area intersect at an angle between 60° and 135°.

6. The plant holder according to claim 1, wherein the semi-permeable foil has a thickness and comprising perforations forming a plurality of tunnels, wherein a ratio of a square-root of an area of a perforation and the thickness of the semi-permeable foil is between 0.6 and 1.35.

7. The plant holder according to claim 1, wherein the semi-permeable foil is arranged to cover at least 80% surface area of a complete boundary between interior space of the plant holder and the exterior space.

8. The plant holder according to claim 1, wherein the semi-permeable foil is arranged to allow a continuous change of the volume of the interior space between 800 cm$^3$ and 125,000 cm$^3$.

9. The plant holder according to claim 1, wherein the semi-permeable foil is made of a self-supporting material.

10. The plant holder according to claim 1, wherein the semi-permeable foil is made of a flexible material.

11. The plant holder according to claim 1, wherein the semi-permeable foil is arranged in the form of a bag.

12. The plant holder according to claim 11, wherein the bag comprises a handle portion.

13. The plant holder according to claim 1, wherein the non-planar boundary comprises an apex-portion and a lateral portion.

14. The plant holder according to claim 13, wherein the apex-portion is arranged to function as an outlet of air and/or water vapor, and wherein the lateral portion is arranged to function as an inlet of air and/or water vapor.

\* \* \* \* \*